US012795643B2

(12) United States Patent
Zhang et al.

(10) Patent No.: US 12,795,643 B2
(45) Date of Patent: Nov. 10, 2026

(54) DYNAMIC UPDATING OF SUBBAND FULL DUPLEX SLOTS AND SYMBOLS

(71) Applicant: QUALCOMM Incorporated, San Diego, CA (US)

(72) Inventors: Qian Zhang, Basking Ridge, NJ (US); Muhammad Sayed Khairy Abdelghaffar, San Jose, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 18/059,665

(22) Filed: Nov. 29, 2022

(65) Prior Publication Data

US 2024/0179698 A1 May 30, 2024

(51) Int. Cl.

| | |
|---|---|
| ***H04W 72/1263*** | (2023.01) |
| ***H04L 5/14*** | (2006.01) |
| ***H04W 72/044*** | (2023.01) |
| ***H04W 72/20*** | (2023.01) |

(52) U.S. Cl.

CPC ........... *H04W 72/1263* (2013.01); *H04L 5/14* (2013.01); *H04W 72/044* (2013.01); *H04W 72/20* (2023.01)

(58) Field of Classification Search

None

See application file for complete search history.

(56) References Cited

U.S. PATENT DOCUMENTS

| | | | | |
|---|---|---|---|---|
| 2022/0022209 | A1 | 1/2022 | Abotabl et al. | |
| 2025/0266979 | A1* | 8/2025 | Seok | H04L 1/00 |
| 2026/0121818 | A1* | 4/2026 | Li | H04L 5/14 |

OTHER PUBLICATIONS (Panasonic, "Discussion on subband non-overlapping full duplex", 3GPP TSG RAN WG1 #111; R1-2211876; Nov. 14-18, 2022; pp. 1-9) (Year: 2022).*

Panasonic; "Discussion on subband non-overlapping full duplex", 3GPP TSG RAN WG1 #111; R1-2211876; Nov. 14-18, 2022; pp. 1-9). (Year: 2020).*

International Search Report and Written Opinion—PCT/US2023/081008—ISA/EPO—Mar. 28, 2024.

(Continued)

*Primary Examiner* — Jae Y Lee
*Assistant Examiner* — Nhu Pham
(74) *Attorney, Agent, or Firm* — QUALCOMM Incorporated

(57) ABSTRACT

Wireless communications systems, apparatuses, and methods are provided. A method of wireless communication performed by a user equipment (UE) includes receiving, from a network unit, a first configuration indicating time location and frequency location for a network side subband full duplex (SBFD) mode of operation, wherein the time location indicates at least one SBFD symbol or slot (SBFD symbol/slot) format and the frequency location indicates a plurality of downlink and uplink subbands or a plurality of uplink subbands and guard bands and receiving, from the network unit, a second configuration indicating a change from the at least one SBFD symbol/slot format to a different SBFD symbol/slot format.

27 Claims, 9 Drawing Sheets

(56) References Cited

OTHER PUBLICATIONS

Nunome T (Panasonic)., et al., "Discussion on Subband Non-overlapping Full Duplex", 3GPP TSG RAN WG1 #111, R1-2211876, 3rd Generation Partnership Project, Mobile Competence Centre, 650, Route Des Lucioles, F-06921 Sophia-Antipolis Cedex, France, vol. 3GPP RAN 1, No. Toulouse, FR, Nov. 14, 2022-Nov. 18, 2022, Nov. 7, 2022, 9 Pages, XP052222441, Sections 2.1.1, 2.1.3, 2.1.4, 2.2.1, 2.2.3.

* cited by examiner

DYNAMIC UPDATING OF SUBBAND FULL DUPLEX SLOTS AND SYMBOLS

TECHNICAL FIELD

This application relates to wireless communication systems, and more particularly, to dynamic updating of subband full duplex slots and symbols in wireless communication systems.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the LTE technology to a next generation new radio (NR) technology. For example, NR is designed to provide a lower latency, a higher bandwidth or throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing may extend the benefit of NR technologies to operating entities that may not have access to a licensed spectrum.

NR may support various deployment scenarios to benefit from the various spectrums in different frequency ranges, licensed and/or unlicensed, and/or coexistence of the LTE and NR technologies. For example, NR may be deployed in a standalone NR mode over a licensed and/or an unlicensed band or in a dual connectivity mode with various combinations of NR and LTE over licensed and/or unlicensed bands.

In a wireless communication network, a BS may communicate with a UE in an uplink direction and a downlink direction. Sidelink was introduced in LTE to allow a UE to send data to another UE (e.g., from one vehicle to another vehicle) without tunneling through the BS and/or an associated core network. The LTE sidelink technology has been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed frequency bands and/or unlicensed frequency bands (e.g., shared frequency bands).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication performed by a user equipment (UE) may include receiving, from a network unit, a first configuration indicating time location and frequency location for a network side subband full duplex (SBFD) mode of operation, wherein the time location indicates at least one SBFD symbol or slot (SBFD symbol/slot) format and the frequency location indicates a plurality of downlink and uplink subbands or a plurality of uplink subbands and guard bands; and receiving, from the network unit, a second configuration indicating a change from the at least one SBFD symbol/slot format to a different SBFD symbol/slot format.

In an additional aspect of the disclosure, a method of wireless communication performed by a network unit may include transmitting, to a user equipment (UE), a first configuration indicating time location and frequency location for a network side subband full duplex (SBFD) mode of operation, wherein the time location indicates at least one SBFD symbol or slot (SBFD symbol/slot) and the frequency location indicates a plurality of downlink and uplink subbands or a plurality of uplink subbands and guard bands; and transmitting, to the UE, a second configuration indicating a change from the at least one SBFD symbol/slot to a different SBFD symbol/slot format.

In an additional aspect of the disclosure, a user equipment (UE) may include a memory; a transceiver; and at least one processor coupled to the memory and the transceiver, wherein the UE is configured to receive, from a network unit, a first configuration indicating time location and frequency location for a network side subband full duplex (SBFD) mode of operation, wherein the time location indicates at least one SBFD symbol or slot (SBFD symbol/slot) format and the frequency location indicates a plurality of downlink and uplink subbands or a plurality of uplink subbands and guard bands; and receive, from the network unit, a second configuration indicating a change from the at least one SBFD symbol/slot format to a different SBFD symbol/slot format.

In an additional aspect of the disclosure, a network unit may include a memory; a transceiver; and at least one processor coupled to the memory and the transceiver, wherein the network unit is configured to transmit, to a user equipment (UE), a first configuration indicating time location and frequency location for a network side subband full duplex (SBFD) mode of operation, wherein the time location indicates at least one SBFD symbol or slot (SBFD symbol/slot) and the frequency location indicates a plurality of downlink and uplink subbands or a plurality of uplink subbands and guard bands; and transmit, to the UE, a second configuration indicating a change from the at least one SBFD symbol/slot to a different SBFD symbol/slot format.

Other aspects, features, and instances of the present invention will become apparent to those of ordinary skill in the art, upon reviewing the following description of specific, exemplary instances of the present invention in conjunction with the accompanying figures. While features of the present invention may be discussed relative to certain aspects and figures below, all instances of the present invention may include one or more of the advantageous features discussed herein. In other words, while one or more instances may be discussed as having certain advantageous features, one or more of such features may also be used in accordance with the various instances of the invention discussed herein. In similar fashion, while exemplary aspects may be discussed below as device, system, or method instances it should be understood that such exemplary instances may be implemented in various devices, systems, and methods.

DETAILED DESCRIPTION

Figure 1:
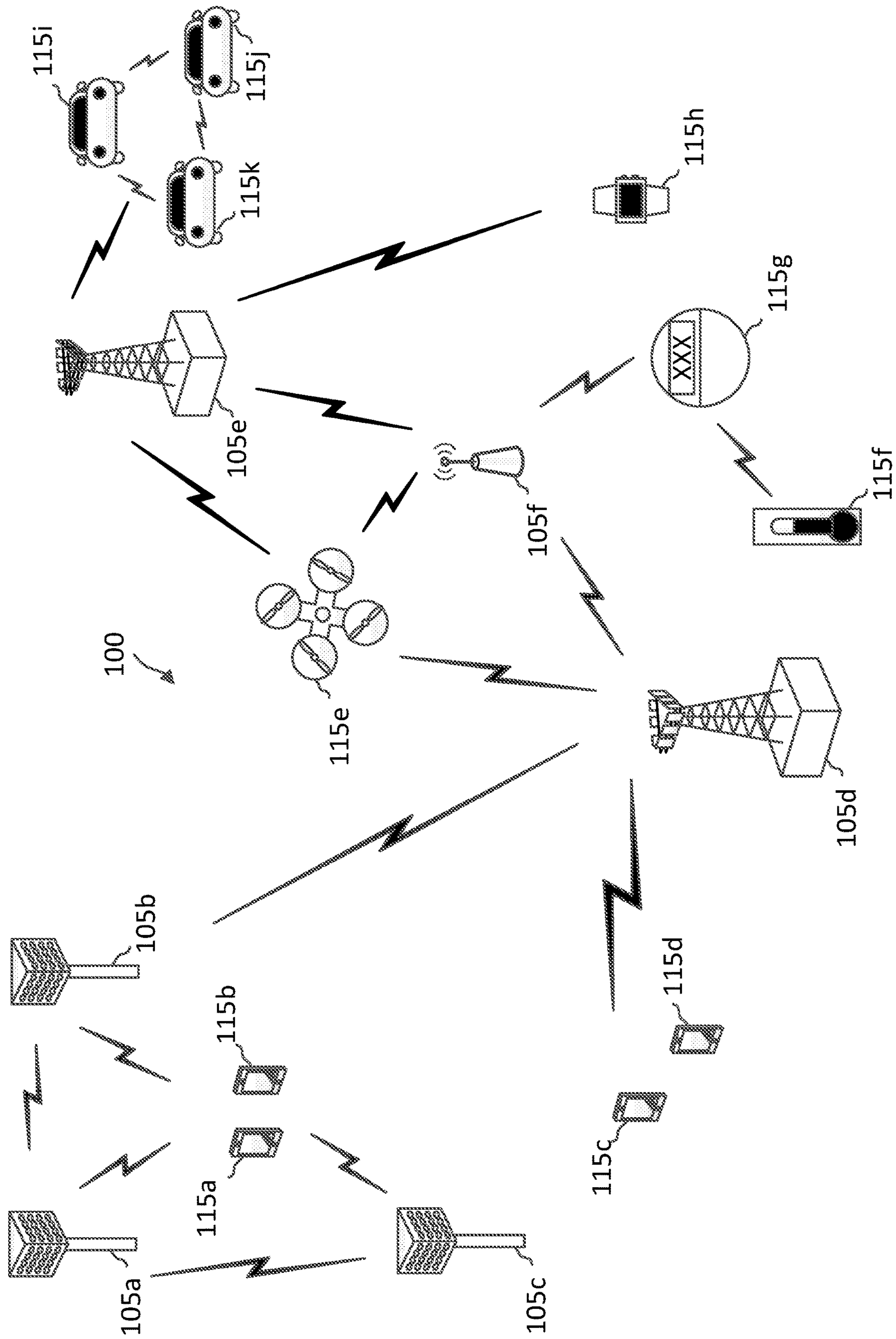
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various instances, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronic Engineers (IEEE) 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHZ FDD/TDD implementations, subcarrier spacing may occur with 15 kHz, for example over 5, 10, 20 MHZ, and the like bandwidth (BW). For other various outdoor and small cell coverage deployments of TDD greater than 3 GHZ, subcarrier spacing may occur with 30 kHz over 80/100 MHZ BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QOS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may include at least one element of a claim.

The deployment of NR over an unlicensed spectrum is referred to as NR-unlicensed (NR-U). Federal Communications Commission (FCC) and European Telecommunications Standards Institute (ETSI) are working on regulating 6 GHz as a new unlicensed band for wireless communications. The addition of 6 GHZ bands allows for hundreds of megahertz (MHz) of bandwidth (BW) available for unlicensed band communications. Additionally, NR-U may also be deployed over 2.4 GHz unlicensed bands, which are currently shared by various radio access technologies (RATs), such as IEEE 802.11 wireless local area network (WLAN) or WiFi and/or license assisted access (LAA). Sidelink communications may benefit from utilizing the additional bandwidth available in an unlicensed spectrum. However, channel access in a certain unlicensed spectrum may be regulated by authorities. For instance, some unlicensed bands may impose restrictions on the power spectral density (PSD) and/or minimum occupied channel bandwidth (OCB) for transmissions in the unlicensed bands. For example, the unlicensed national information infrastructure (UNII) radio band has a minimum OCB requirement of about at least 70 percent (%).

Some sidelink systems may operate over a 20 MHz bandwidth, e.g., for listen before talk (LBT) based channel accessing, in an unlicensed band. A BS may configure a sidelink resource pool over one or multiple 20 MHZ LBT sub-bands for sidelink communications. A sidelink resource pool is typically allocated with multiple frequency subchannels within a sidelink band width part (SL-BWP) and a sidelink UE may select a sidelink resource (e.g., one or multiple subchannel) in frequency and one or multiple slots in time) from the sidelink resource pool for sidelink communication.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also may be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which may enable flexibility in network design. The various units of the disaggregated base station, or disaggregated RAN architecture, may be configured for wired or wireless communication with at least one other unit.

Various aspects relate generally to wireless communication and more particularly to signaling for dynamic waveform switching. Some aspects more specifically relate to a network unit signaling a user equipment (UE) to switch between a first waveform type and a second waveform type for uplink communications. In some examples, a network unit may transmit an indicator to the UE to enable switching between the waveform types. When waveform switching is enabled, the network unit may transmit DCI to the UE indicating which waveform type to use for uplink communications. In some examples, the size of the DCI may be the same size for the first waveform type and the second waveform type. As such, the UE may blind decode the DCI using a common DCI size for the first waveform type and the second waveform type. The DCI may further include scheduled resources for a physical uplink shared channel (PUSCH) communication associated with the UE. The UE may transmit PUSCH communications to the network unit via the scheduled resources using the indicated waveform type.

Additionally or alternatively, the UE may switch between the first waveform type and the second waveform type on a semi-static basis. In some examples, a network unit may transmit an indicator to the UE to enable switching between the waveform types. When waveform switching is enabled, the network unit may transmit non-uplink scheduling DCI and/or a MAC-CE communication to the UE indicating which waveform type to use for uplink communications. The network unit may subsequently transmit uplink scheduling DCI to the UE using a DCI size associated with the previously indicated waveform type. The DCI size associated with the first waveform type may be different from the DCI associated with the second waveform type. As such, the UE may blind decode the DCI based on the DCI size associated with the indicated waveform type. The UE may transmit PUSCH communications to the network unit via the scheduled resources using the indicated waveform type.

Particular aspects of the subject matter described in this disclosure may be implemented to realize one or more of the following potential advantages. In some examples, by implementing dynamic waveform switching according to embodiments of the present disclosure, the described techniques may be used to reduce computing resources, memory requirements, latency, and/or power consumption in the UE by blind decoding a DCI having a common size for the first and second waveform types as compared to blind decoding a first DCI associated with the first waveform type and blind decoding a second, different sized DCI associated with the second waveform type.

The dynamic waveform switching according to embodiments of the present disclosure may increase network coverage and/or network capacity. For example, the UE may switch to transmitting uplink communications using a DFT-s-OFDM waveform to increase range and coverage. In some examples, the UE may switch to transmitting uplink communications using a CP-OFDM waveform to increase throughput and/or data rate.

FIG. 1 illustrates a wireless communication network 100 according to some aspects of the present disclosure. The network 100 includes a number of base stations (BSs) 105 and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" may refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105*d* and 105*e* may be regular macro BSs, while the BSs 105*a*-105*c* may be macro BSs enabled with one of three dimension (3D), full dimension (FD), or massive MIMO. The BSs 105*a*-105*c* may take advantage of their higher dimension MIMO capabilities to exploit 3D beamforming in both elevation and azimuth beamforming to increase coverage and capacity. The BS 105*f* may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115*a*-115*d* are examples of mobile smart phone-type devices accessing network 100. A UE 115 may also be a machine specifically configured for connected communication, including machine type communication (MTC), enhanced MTC (eMTC), narrowband IoT (NB-IOT) and the like. The UEs 115*e*-115*h* are examples of various machines configured for communication that access the network 100. The UEs 115*i*-115*k* are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105*a*-105*c* may serve the UEs 115*a* and 115*b* using 3D beamforming and coordinated spatial techniques, such as coordinated multipoint (CoMP) or multi-connectivity. The macro BS 105*d* may perform backhaul communications with the BSs 105*a*-105*c*, as well as small cell, the BS 105*f*. The macro BS 105*d* may also transmits multicast services which are subscribed to and received by the UEs 115*c* and 115*d*. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of an evolved NodeB (eNB) or an access node controller (ANC)) may interface with the core network 130 through backhaul links (e.g., S1, S2, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115*c*, which may be a vehicle (e.g., a car, a truck, a bus, an autonomous vehicle, an aircraft, a boat, etc.). Redundant communication links with the UE 115*e* may include links from the macro BSs 105*d* and 105*e*, as well as links from the small cell BS 105*f*. Other machine type devices, such as the UE 115*f* (e.g., a thermometer), the UE 115*g* (e.g., smart meter), and UE 115*h* (e.g., wearable device) may communicate through the network 100 either directly with BSs, such as the small cell BS 105*f*, and the macro BS 105*e*, or in multi-hop configurations by communicating with another user device which relays its information to the network, such as the UE 115*f* communicating temperature measurement information to the smart meter, the UE 115*g*, which is then reported to the network through the small cell BS 105*f*. In some aspects, the UE 115*h* may harvest energy from an ambient environment associated with the UE 115*h*. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115*i*, 115*j*, or 115*k* and other UEs 115, and/or vehicle-to-infrastructure (V21) communications between a UE 115*i*, 115*j*, or 115*k* and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some instances, the BSs 105 may assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication may be in the form of radio frames. A radio frame may be divided into a plurality of subframes, for example, about 10. Each subframe may be divided into slots, for example, about 2. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes may be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal may have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some instances, the BSs 105 and the UEs 115 may communicate using self-contained subframes. A self-contained subframe may include a portion for DL communication and a portion for UL communication. A self-contained subframe may be DL-centric or UL-centric. A DL-centric subframe may include a longer duration for DL communication than for UL communication. A UL-centric subframe may include a longer duration for UL communication than for UL communication.

In some instances, the network 100 may be an NR network deployed over a licensed spectrum. The BSs 105 may transmit synchronization signals (e.g., including a primary synchronization signal (PSS) and a secondary synchronization signal (SSS)) in the network 100 to facilitate synchronization. The BSs 105 may broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some instances, a UE 115 attempting to access the network 100 may perform an initial cell search by detecting a PSS from a BS 105. The PSS may enable synchronization of period timing and may indicate a physical layer identity value. The UE 115 may then receive an SSS. The SSS may enable radio frame synchronization, and may provide a cell identity value, which may be combined with the physical layer identity value to identify the cell. The SSS may also enable detection of a duplexing mode and a cyclic prefix length. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, SRS, and cell barring.

After obtaining the MIB, the RMSI and/or the OSI, the UE 115 may perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 may enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

The network 100 may be designed to enable a wide range of use cases. While in some examples a network 100 may utilize monolithic base stations, there are a number of other architectures which may be used to perform aspects of the present disclosure. For example, a BS 105 may be separated into a remote radio head (RRH) and baseband unit (BBU). BBUs may be centralized into a BBU pool and connected to RRHs through low-latency and high-bandwidth transport links, such as optical transport links. BBU pools may be cloud-based resources. In some aspects, baseband processing is performed on virtualized servers running in data centers rather than being co-located with a BS 105. In another example, based station functionality may be split between a remote unit (RU), distributed unit (DU), and a central unit (CU). An RU generally performs low physical layer functions while a DU performs higher layer functions, which may include higher physical layer functions. A CU performs the higher RAN functions, such as radio resource control (RRC).

For simplicity of discussion, the present disclosure refers to methods of the present disclosure being performed by base stations, or more generally network entities, while the functionality may be performed by a variety of architectures other than a monolithic base station. In addition to disaggregated base stations, aspects of the present disclosure may also be performed by a centralized unit (CU), a distributed unit (DU), a radio unit (RU), a Near-Real Time (Near-RT) RAN Intelligent Controller (RIC), a Non-Real Time (Non-RT) RIC, integrated access and backhaul (IAB) node, a relay node, a sidelink node, etc.

In some aspects, the UE 115 may receive an indicator from the BS 105 indicating dynamic waveform switching between a first waveform type and a second waveform type. The UE 115 may monitor, based on the indicator, for downlink control information (DCI) from the network unit, wherein at least one of a size of the DCI, a size of a bitfield of the DCI, or a location of the bitfield of the DCI is interpreted based on the indicator.

In some aspects, the UE 115 may receive, from the BS 105, a first configuration indicating time location and frequency location for a network side subband full duplex (SBFD) mode of operation. The time location indicates at least one SBFD symbol or slot (SBFD symbol/slot) format and the frequency location indicates a plurality of downlink and uplink subbands or a plurality of uplink subbands and guard bands. In some aspects, the UE 115 may receive, from the BS 105, a second configuration indicating a change from the at least one SBFD symbol/slot format to a different SBFD symbol/slot format.

Figure 2:
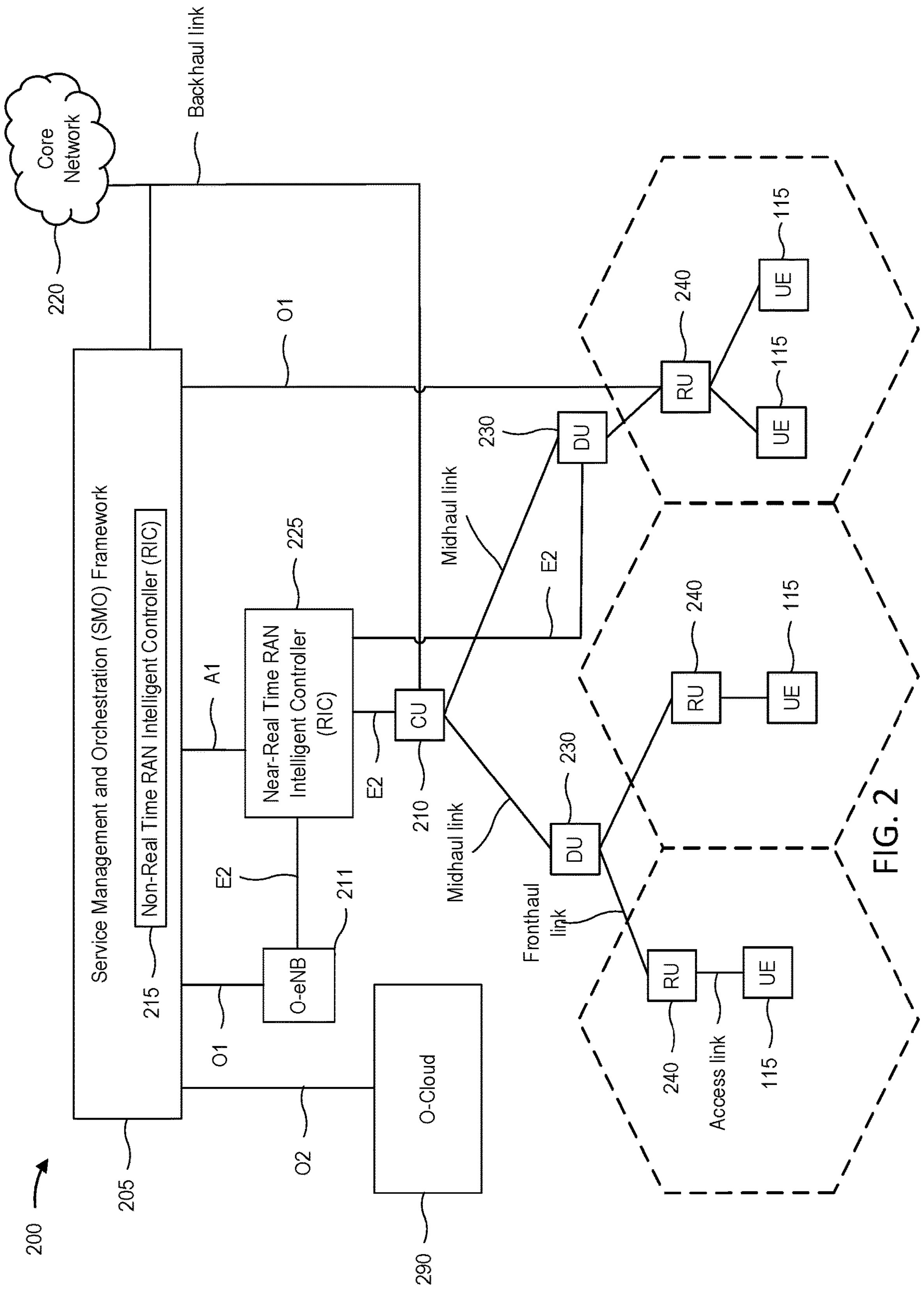
FIG. 2 illustrates an example disaggregated base station architecture according to some aspects of the present disclosure.

FIG. 2 shows a diagram illustrating an example disaggregated base station 200 architecture. The disaggregated base station 200 architecture may include one or more central units (CUs) 210 that may communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 115 via one or more radio frequency (RF) access links. In some implementations, the UE 115 may be simultaneously served by multiple RUs 240.

Each of the units, i.e., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, may be configured to communicate with one or more of the other units via the transmission medium. For example, the units may include a wired interface configured to receive or transmit signals over a wired transmission medium to one or more of the other units. Additionally, the units may include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions may include radio resource control (RRC), packet data convergence protocol (PDCP), service data adaptation protocol (SDAP), or the like. Each control function may be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 may be logically split into one or more CU-UP units and one or more CU-CP units. The CU-UP unit may communicate bidirectionally with the CU-CP unit via an interface, such as the E1 interface when implemented in an O-RAN configuration. The CU 210 may be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 230 may further host one or more low PHY layers. Each layer (or module) may be implemented with an interface configured to communicate signals with other layers (and modules) hosted by the DU 230, or with the control functions hosted by the CU 210.

Lower-layer functionality may be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 may be implemented to handle over the air (OTA) communication with one or more UEs 115. In some implementations, real-time and non-real-time aspects of control and user plane communication with the RU(s) 240 may be controlled by the corresponding DU 230. In some scenarios, this configuration may enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements may include CUs 210, DUs 230, RUs 240 and Near-RT RICs 225. In some implementations, the SMO Framework 205 may communicate with a hardware aspect of a 4G RAN, such as an open eNB (O-eNB) 211, via an O1 interface. Additionally, in some implementations, the SMO Framework 205 may communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In some aspects, the UE 115 may receive an indicator from the RU 240 indicating dynamic waveform switching between a first waveform type and a second waveform type. The UE 115 may monitor, based on the indicator, for downlink control information (DCI) from the RU 240, wherein at least one of a size of the DCI, a size of a bitfield of the DCI, or a location of the bitfield of the DCI is interpreted based on the indicator.

In some aspects, the UE 115 may receive, from the RU 240, a first configuration indicating time location and frequency location for a network side subband full duplex (SBFD) mode of operation. The time location indicates at least one SBFD symbol or slot (SBFD symbol/slot) format and the frequency location indicates a plurality of downlink and uplink subbands or a plurality of uplink subbands and guard bands. In some aspects, the UE 115 may receive, from the RU 240, a second configuration indicating a change from the at least one SBFD symbol/slot format to a different SBFD symbol/slot format.

Figure 3:
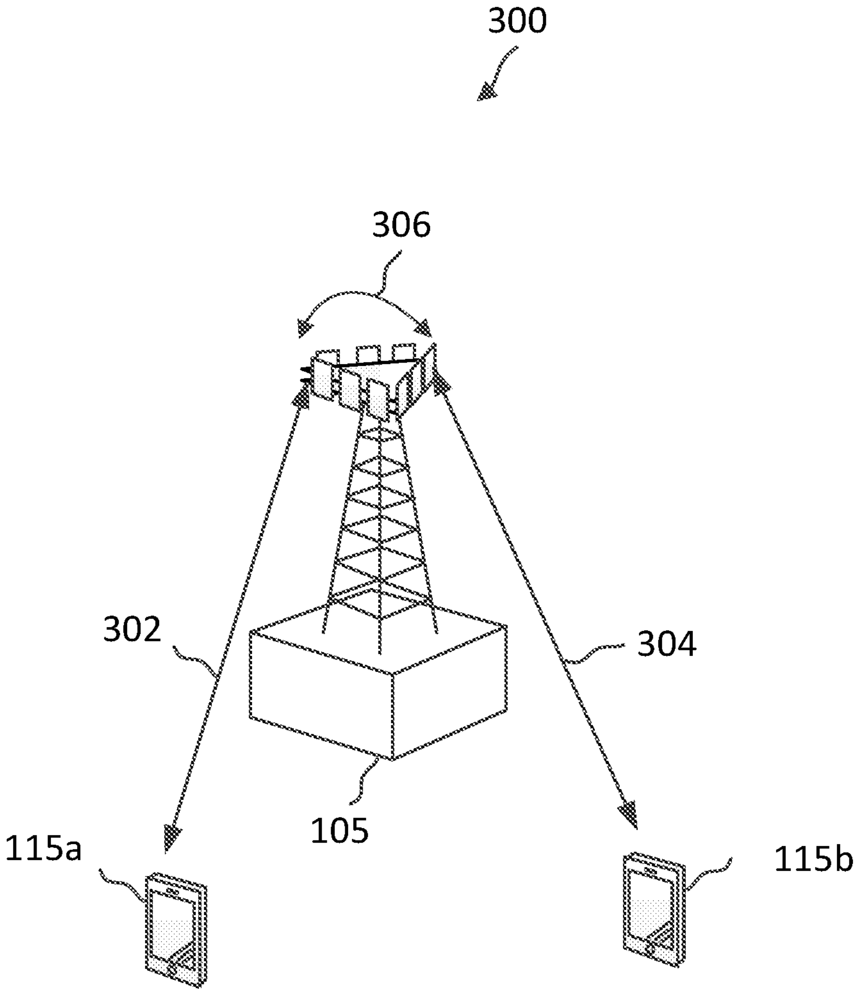
FIG. 3 illustrates a wireless communication network operating in subband full duplex mode according to some aspects of the present disclosure.

FIG. 3 illustrates a wireless communication network 300 operating in subband full duplex (SBFD) mode. The wireless communication network 300 may include wireless communication network 100 or wireless communication network 200. In some aspects, the network unit 105 may operate in subband full duplex mode while the UE 115*a* and UE 115*b* operate in half duplex mode. When operating in SBFD, the UEs 115*a* and/or 115*b* may receive a first configuration from the network unit 105 indicating time location and frequency location for a network side subband full duplex (SBFD) mode of operation. In this regard, the UEs 115*a* and/or 115*b* may receive the first configuration via at least one of a cell common radio resource control (RRC) communication, a UE dedicated RRC communication, a medium access control control (MAC-CE) communication, UE dedicated downlink control information (DCI), and/or UE group common DCI.

In some aspects, the first configuration may enable the network unit 105 to operate in a full duplex TDD mode in which the network unit 105 simultaneously transmits communications over link 302 to the UE 115*a* and receives communications over link 304 from the UE 115*b*. The network unit 105 may simultaneously transmit communications over link 302 to the UE 115*b* and receive communications over link 304 from the UE 115*a*. However, when simultaneously transmitting and receiving communications over links 302 and 304, the network unit 105 may experience self-interference 306 (e.g., interference to a receiver of the network unit caused by a transmitter of the network unit 105) and/or clutter interference (e.g., interference to a receiver of the network unit 105 caused by a reflection of a signal transmitted by the network unit 105). In order to mitigate these interference effects, the network unit 105 may transmit a second configuration to the UE 115*a* and/or UE 115*b* changing the frequency location and/or the symbol/slot format associated with the subbands.

In some aspects, the UE 115*a* and/or the UE 115*b* may receive a second configuration from the network unit 105 indicating a change from the configured SBFD symbol/slot format to a different SBFD symbol/slot format. In this regard, the UE 115*a* and/or the UE 115*b* may receive the second configuration via at least one of a cell common radio resource control (RRC) communication, a UE dedicated RRC communication, a medium access control control (MAC-CE) communication, UE dedicated downlink control information (DCI), or UE group common DCI. The UE 115*a* and/or the UE 115*b* may apply the second configuration to one or more component carriers indicated in a component carrier list.

Figure 4A:
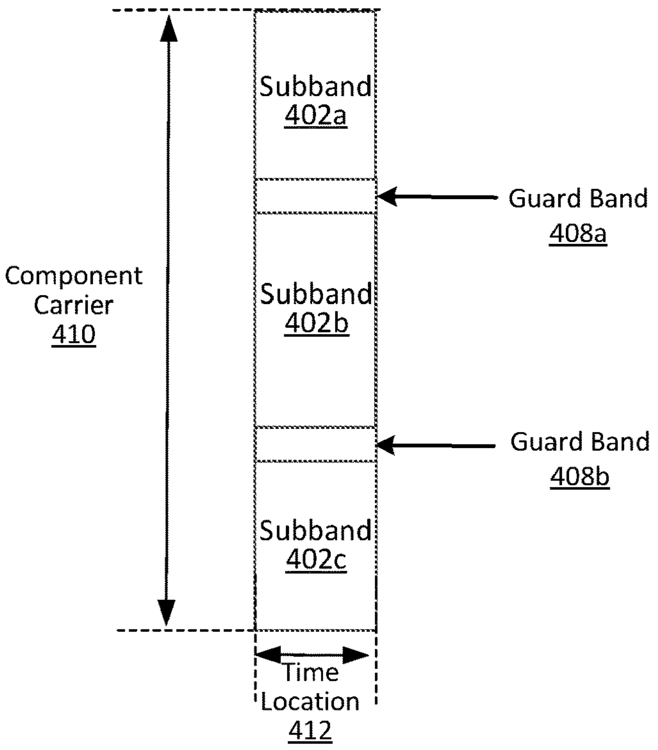
FIG. 4A illustrates subbands and guard bands in a component carrier according to some aspects of the present disclosure.

FIG. 4A illustrates subbands and guard bands in a component carrier according to some aspects of the present disclosure. In some aspects, a UE may receive a first configuration from a network unit indicating time location and frequency location for a network side subband full duplex (SBFD) mode of operation. The time location 412 may indicate at least one SBFD symbol or slot (SBFD symbol/slot) format. In some aspects, the frequency location may indicate a plurality of downlink and uplink subbands 402 and/or a plurality of uplink subbands 402 and guard bands 408. In some aspects, the UE may receive a second configuration from the network unit indicating a change from the at least one SBFD symbol/slot format to a different SBFD symbol/slot format.

In some aspects, the time location 412 may indicate one or more slot locations, one or more symbol locations, and/or a time period (e.g., a number of milliseconds) in which the subbands 402 are configured for an SBFD symbol/slot format. An SBFD symbol may be a symbol during which the network unit operates in an SBFD mode. An SBFD slot may be a slot during which the network unit operates in an SBFD mode. When operating in SBFD mode, the network unit may transmit to one or more UEs in subbands 402 of a component carrier(s) 410 (e.g., a time-division duplex (TDD) carrier) while simultaneously receiving communications from one or more other UEs in other subbands 402 of the component carrier(s) 410. Although the example of FIG. 4A shows one component carrier 410, the present disclosure is not so limited and the network unit may operate in SBFD mode over multiple component carriers 410.

In some aspects, the frequency location may indicate a plurality of downlink subbands 402, uplink subbands 402, and/or flexible subbands 402. The frequency location may indicate any combination of downlink subbands 402, uplink subbands 402, and/or flexible subbands 402. For example, the frequency location may include a downlink/uplink/downlink (D/U/D) format indicating a downlink subband in a higher portion (e.g. an edge portion) of the component carrier 410 in subband 402*a*, an uplink subband located within a middle portion of the component carrier 410 in subband 402*b* and a downlink subband in a lower portion (e.g., an edge portion) of the component carrier 410 in subband 402*c*. Additionally or alternatively, the frequency location may include a flexible/uplink/flexible (F/U/F) format indicating a flexible subband in a higher portion (e.g. an edge portion) of the component carrier 410 in subband 402*a*, an uplink subband located within a middle portion of the component carrier 410 in subband 402*b*, and a flexible subband in a lower portion (e.g., an edge portion) of the component carrier 410 in subband 402*c*. Additionally or alternatively, the frequency location may include a uplink/downlink/uplink (U/D/U) format indicating an uplink subband in a higher portion (e.g. an edge portion) of the component carrier 410 in subband 402*a*, a downlink subband located within a middle portion of the component carrier 410 in subband 402*b*, and an uplink subband in a lower portion (e.g., an edge portion) of the component carrier 410 in subband 402*c*.

In some aspects, the downlink subbands 402, the uplink subbands 402, and the flexible subbands 402 do not overlap one another. In this regard, the downlink subbands 402, uplink subbands 402, and flexible subbands 402 may be separated from one another by guard bands 408. The first configuration may indicate guards bands 408 associated with the frequency locations of the subbands 402. The guard bands 408 may be frequencies in which the network unit and/or the UE refrain from transmitting in. The guard bands 408 may be located contiguous to the upper end and/or the lower end of the subbands 402. For example, guard band 408*a* may be located contiguous to the lower end of subband 402*a* and contiguous to the upper end of subband 402*b*. Guard band 408*b* may be located contiguous to the lower end of subband 402*b* and contiguous to the upper end of subband 402*c*. In some aspects, the size (e.g., frequency range) of the guard bands 408 may be based on the frequencies associated with the subbands 402, the frequency range of the subbands 402 (e.g., the number of subbands), the component carrier frequency range, or other suitable parameter(s).

In some aspects, the UE may apply the first configuration to one or more component carriers 410. For example, the UE may receive a list of component carriers 410 from the network unit to which the UE may apply the first configuration. In some aspects, the plurality of downlink and uplink subbands 402 or the plurality of uplink subbands 402 and guard bands 408 may be cross multiple time-division duplex (TDD) carriers in which each downlink subband 402 and/or uplink subband 402 is a component carrier 410.

In some aspects, the SBFD symbol/slot may be configured on a legacy downlink symbol/slot, a legacy uplink symbol/slot, and/or a legacy flexible symbol/slot and be treated as a fixed SBFD configuration with a plurality of downlink subbands 402, uplink subbands 402, and/or flexible subbands 402. For example, the UE may receive an initial RRC configuration (e.g., legacy configuration) prior to receiving the first configuration. The legacy configuration may configure all subbands 402 of the component carrier 410 as a legacy downlink symbol/slot, a legacy uplink symbol/slot, or a legacy flexible symbol/slot. The flexible symbol/slot may be configured for DL communication and/or UL communication. The initial RRC (e.g., legacy) configuration may configure all of the subbands 402 of the component carrier 410 to a single type of communication (e.g., all subbands 402 configured for UL communication, DL communication, or flexible communication).

In some aspects, the second configuration may indicate a change (e.g., an update) from an SBFD symbol/slot format to a different SBFD symbol/slot format. The second configuration may indicate the change as a fallback from any SBFD symbol/slot format (e.g., uplink, downlink, or flexible) to an initial RRC configured symbol/slot format. For example, the change may be from an SBFD D/U/D format to an initial downlink format. The change may be from an SBFD F/U/F format to an initial flexible format. The change may be from an SBFD U/D/U format to an initial uplink format.

Additionally or alternatively, the second configuration may indicate the change as a fallback from any SBFD symbol/slot format (e.g., uplink, downlink, or flexible) to an initial slot format indicator (SFI) configured symbol/slot format. For example, the change may be from an SBFD D/U/D format to an SFI configured downlink format. The change may be from an SBFD F/U/F format to an SFI configured flexible format. The change may be from an SBFD U/D/U format to an SFI configured uplink format.

Additionally or alternatively, the second configuration may update (e.g., override) the frequency location and/or SBFD symbol/slot format for some or all of the subbands 402. For example, the first configuration may configure the subbands 402 for an SBFD symbol/slot format (e.g., uplink, downlink, and/or flexible communication), while the second configuration changes the frequency location and/or the SBFD symbol/slot format. In some aspects, the frequency location may remain the same in the second configuration but the SBFD symbol/slot format may change. In other words, the second configuration may change the type of communication for the same subbands 402 configured by the first configuration. In some aspects, the second configuration may change the frequency location of the subbands 402. The second configuration may increase or decrease the number of subbands 402 (e.g., the bandwidth) associated with uplink, downlink, and/or flexible communications.

In some aspects, the second configuration may change the time location 412 (e.g., time resources) associated the SBFD symbol/slot format. In this regard, the second configuration may change (e.g., update) one or more slot locations, one or more symbol locations, and or a time period (e.g., a number of milliseconds) associated the SBFD symbol/slot format.

In some aspects, the second configuration may change the guards bands 408 associated with the subbands 402. The guard bands 408 may be frequencies in which the network unit and/or the UE refrain from transmitting in. The guard bands 408 may be located contiguous to the upper end and/or the lower end of the subbands 402. The second configuration may change the size of the guard bands 408 based on the change in the frequency locations and/or the change in the SBFD symbol/slot format.

In some aspects, the second configuration may indicate a change from an SBFD symbol/slot to a different SBFD symbol/slot format based on a buffer status report (BSR) associated with the UE. In this regard, the UE may transmit a buffer status report (BSR) to the network unit indicating an amount of data (e.g., number of transport blocks) the UE has scheduled for transmitting to the network unit. The network unit may determine the second configuration based, at least in part, on the BSR. For example, if the BSR indicates the UE has an amount of data that exceeds the capacity of the resources indicated in the first configuration, the network unit may transmit the second configuration to the UE that increases the UL communication resources. For example, the second configuration may increase the number of frequency subbands 402, the number of slots, and/or the number of symbols allocated to the UE for UL communications.

Figure 4B:
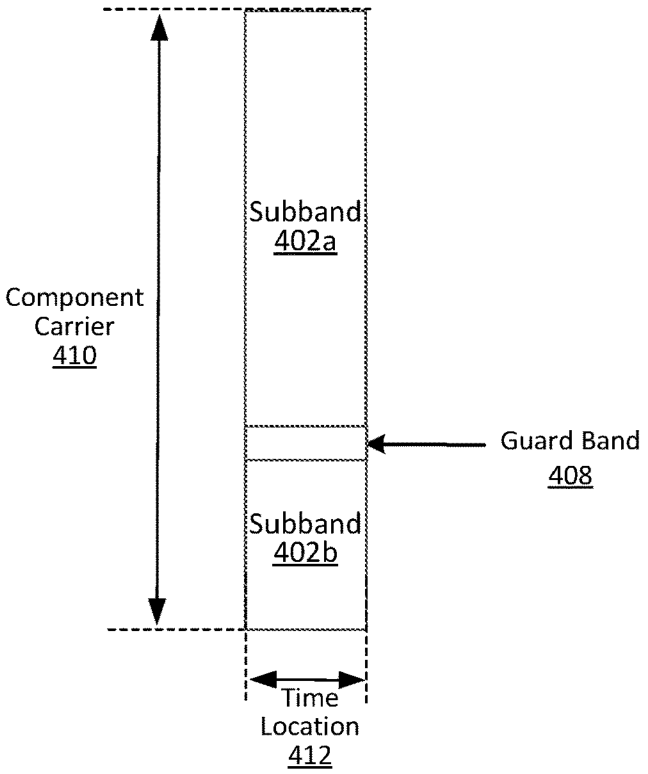
FIG. 4B illustrates subbands and guard bands in a component carrier according to some aspects of the present disclosure.

FIG. 4B illustrates subbands and guard bands in a component carrier according to some aspects of the present disclosure. In some aspects, a UE may receive a first configuration from a network unit indicating time location and frequency location for a network side subband full duplex (SBFD) mode of operation. The time location 412 may indicate at least one SBFD symbol or slot (SBFD symbol/slot) format. In some aspects, the frequency location may indicate a plurality of downlink and uplink subbands 402 or a plurality of uplink subbands 402 and guard bands 408. In some aspects, the UE may receive a second configuration from the network unit indicating a change from the at least one SBFD symbol/slot format to a different SBFD symbol/slot format.

In some aspects, the time location 412 may indicate one or more slot locations, one or more symbol locations, and/or a time period (e.g., a number of milliseconds) in which the subbands 402 are configured for an SBFD symbol/slot format. An SBFD symbol may be a symbol during which the network unit operates in an SBFD mode. An SBFD slot may be a slot during which the network unit operates in an SBFD mode. When operating in SBFD mode, the network unit may transmit to one or more UEs in subbands 402 of a component carrier(s) 410 (e.g., a time-division duplex (TDD) carrier) while simultaneously receiving communications from one or more other UEs in other subbands 402 of the component carrier(s) 410. Although the example of FIG. 4A shows one component carrier 410, the present disclosure is not so limited and the network unit may operate in SBFD mode over multiple component carriers 410.

FIG. 4B shows a non-limiting example, of the component carrier 410 being partitioned into two subbands 402*a* and 402*b*. The subbands 402*a* and 402*b* may be separated by guard band 408. The SBFD symbol/slot format associated with subbands 402*a* and 402*b* may include any combination of uplink, downlink, or flexible formats. For example, SBFD symbol/slot format may include a U/D format indicating uplink communication in subband 402*a* and downlink communication in subband 402*b* of the component carrier 410. Additionally or alternatively, the SBFD symbol/slot format may include a D/U format indicating downlink communication in subband 402*a* and uplink communication in subband 402*b* of the component carrier 410.

Figure 5:
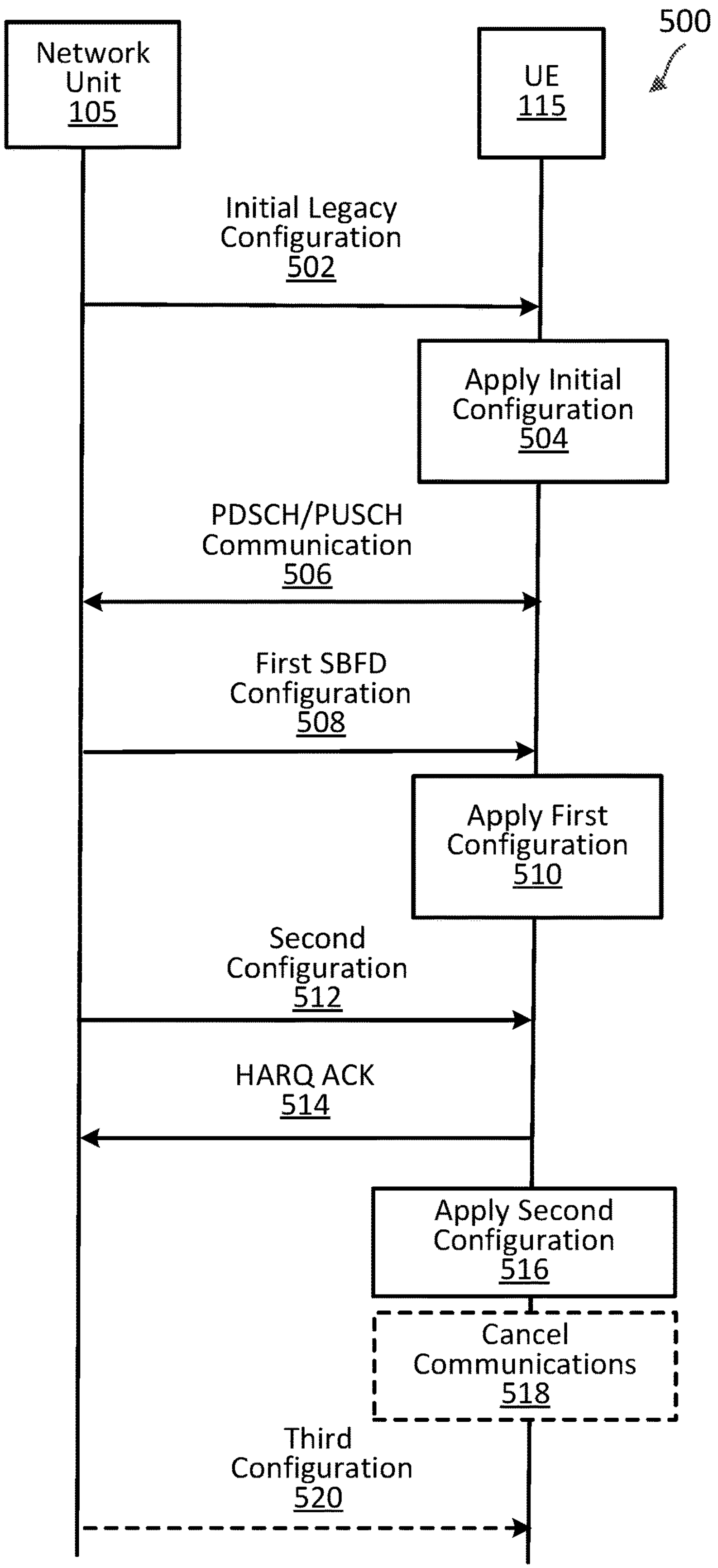
FIG. 5 is a signal flow diagram of a communication method according to some aspects of the present disclosure.

FIG. 5 is a flow diagram of a communication method 500 according to some aspects of the present disclosure. Aspects of the method 500 may be executed by a computing device (e.g., a processor, processing circuit, and/or other suitable component) of a wireless communication device or other suitable means for performing the actions. For example, a wireless communication device, such as the BS 105, the RU 240, the DU 230, the CU 210, and/or the network unit 700, may utilize one or more components, such as the processor 702, the memory 704, the subband full duplex module 708, the transceiver 710, the modem 712, and the one or more antennas 716, to execute aspects of method 500. For example, a wireless communication device, such as the UE 115 or the UE 600 may utilize one or more components, such as the processor 602, the memory 604, the subband full duplex module 608, the transceiver 610, the modem 612, and the one or more antennas 616, to execute aspects of method 500. The method 500 may employ similar mechanisms as in the networks 100, 200, and/or 300 and the aspects and actions described with respect to FIGS. 3-4. As illustrated, the method 500 includes a number of enumerated actions, but the method 500 may include additional actions before, after, and in between the enumerated actions. In some aspects, one or more of the enumerated actions may be omitted or performed in a different order.

At action 502, the network unit 105 may transmit an initial configuration (e.g., a legacy configuration) to the UE 115 indicating symbol/slot format for one or more component carriers. In this regard, the network unit 105 may transmit the initial configuration via at least one of a cell common radio resource control (RRC) communication, a UE dedicated RRC communication, a medium access control control (MAC-CE) communication, UE dedicated downlink control information (DCI), and/or UE group common DCI. The initial legacy configuration may configure all subbands of the component carrier as a legacy downlink symbol/slot, a legacy uplink symbol/slot, or a legacy flexible symbol/slot. The flexible symbol/slot may be configured for DL communication and/or UL communication. The initial RRC (e.g., legacy) configuration may configure all of the subbands of the frequency band to a single type of communication (e.g., all subbands configured for UL communication, DL communication, or flexible communication).

At action 504, the UE may apply the initial legacy configuration to the one or more component carriers.

At action 506, the UE may communicate with the network unit 105. For example, if the component carrier was configured for downlink communication at action 502, the network unit 105 may transmit a PDSCH communication to the UE 115. If the component carrier was configured for uplink communication at action 502, the UE 115 may transmit a PUSCH communication to the network unit 105.

At action 508, the network unit 105 may transmit a first configuration indicating a symbol/slot format to the UE 115. The first configuration may indicate a time location indicating one or more slot locations, one or more symbol locations, and/or a time period (e.g., a number of milliseconds)

in which the subbands are configured for an SBFD symbol/slot format. An SBFD symbol may be a symbol during which the network unit operates in an SBFD mode. An SBFD slot may be a slot during which the network unit operates in an SBFD mode. When operating in SBFD mode, the network unit 105 may transmit to one or more UEs 115 in subbands of a component carrier(s) (e.g., a time-division duplex (TDD) carrier) while simultaneously receiving communications from one or more other UEs 115 in other subbands of the component carrier(s).

At action 510, the UE 115 may apply the first configuration to the time locations and frequency locations indicated by the first configuration received at action 508.

At action 512, the network unit 105 may transmit a second configuration indicating a symbol/slot format to the UE 115. In some aspects, the UE 115 may receive a second configuration that overrides or partially overrides the first configuration. For example, the second configuration may change the SBFD symbol/slot format (e.g., slots, symbols, subbands) of the first configuration. Additionally or alternatively, the second configuration may change the SBFD symbol/slot format to revert (e.g., fallback) to the initial (e.g., legacy) RRC configuration.

At action 514, the UE 115 may transmit a HARQ ACK communication to the network unit 105 acknowledging receipt of the second configuration.

At action 516, the UE 115 may apply the second configuration. In some aspects, the UE 115 may apply the second configuration after a time period following the receipt of the second configuration. In some aspects, the second configuration may indicate when the UE 115 should apply the second configuration. In some aspects, the time period may be preconfigured in the UE 115. The time period may include a number of symbols, a number of slots, a number of milliseconds, or other suitable time period before the UE 115 applies the third configuration. In some aspects, the time period may be based on a subcarrier spacing (SCS) associated with the subbands.

In some aspects, the UE 115 may apply the second configuration after a time period following the transmitting of the HARQ ACK to the network unit 105 at action 514. For example, the UE 115 may apply the second configuration a number of symbols, a number of slots, a number of milliseconds, or other suitable time period after transmitting the HARQ ACK.

At action 516, the UE 115 may cancel certain communications. In some aspects, the UE 115 may cancel one or more scheduled communications based on the second configuration. For example, the UE 115 may cancel one or more scheduled uplink communications based on the second configuration changing one or SBFD symbol/slot formats to DL symbol/slot format or flexible symbol/slot format. Additionally or alternatively, the UE 115 may cancel one or more scheduled downlink communications based on the second configuration changing one or SBFD symbol/slot formats to UL symbol/slot format or flexible symbol/slot format.

In some aspects, the UE 115 may cancel one or more scheduled uplink communications based on the second configuration changing one or SBFD symbol/slot formats to a legacy downlink symbol/slot format or a legacy flexible symbol/slot format. Additionally or alternatively, the UE 115 may cancel one or more scheduled downlink communications based on the second configuration changing one or SBFD symbol/slot formats to a legacy uplink symbol/slot format or a legacy flexible symbol/slot format.

In some aspects, the UE 115 may cancel one or more scheduled downlink communications except physical downlink control channel (PDCCH) communications based on the second configuration indicating the change to a legacy downlink symbol/slot format. The UE 115 may receive the PDCCH in one or more symbols in a CORESET configured for the UE 115 to monitor.

At action 520, the network unit 105 may optionally transmit to the UE 115 a third configuration comprising a parameter set (e.g., frequency domain resource allocation, transmit power, beam selection, timing advance, modulation and coding scheme, etc.) associated with DL communication and/or a parameter set (e.g., frequency domain resource allocation, transmit power, beam selection, timing advance, modulation and coding scheme, etc.) associated with UL communication based on the second configuration indicating a change to a legacy flexible symbol/slot format. The UE 115 may receive PDSCH-SPS communications, CSI-RS, and PDCCH communications across the downlink subbands without rate matching or puncturing. The UE 115 may transmit CG, SRS, and/or PUCCH communications across the uplink subchannels using the parameter set in the third configuration without adjusting a frequency hopping offset.

Figure 6:
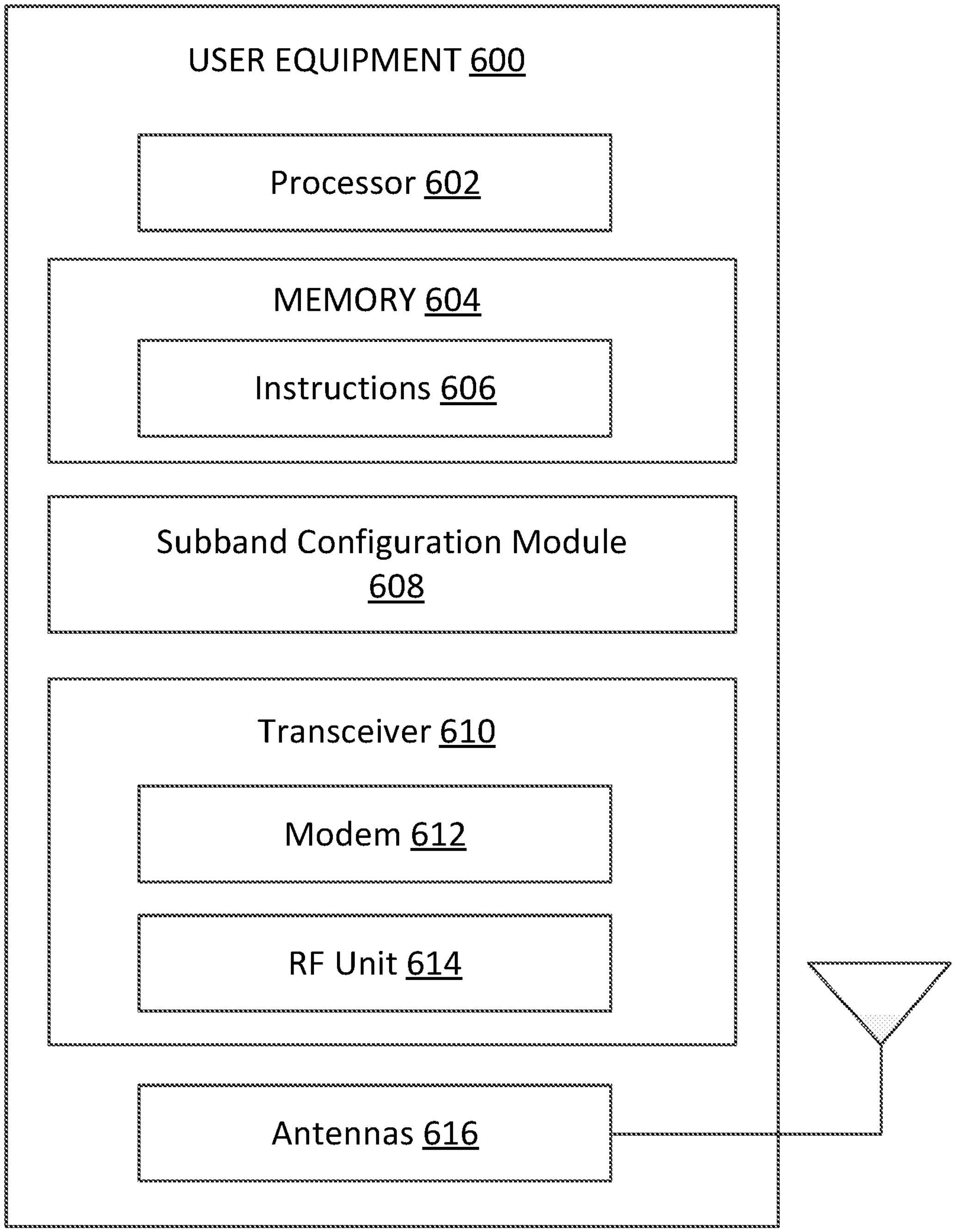
FIG. 6 is a block diagram of an exemplary user equipment (UE) according to some aspects of the present disclosure.

FIG. 6 is a block diagram of an exemplary UE 600 according to some aspects of the present disclosure. The UE 600 may be the UE 115 in the network 100, or 200 as discussed above. As shown, the UE 600 may include a processor 602, a memory 604, a subband full duplex module 608, a transceiver 610 including a modem subsystem 612 and a radio frequency (RF) unit 614, and one or more antennas 616. These elements may be coupled with each other and in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some instances, the memory 604 includes a non-transitory computer-readable medium. The memory 604 may store instructions 606. The instructions 606 may include instructions that, when executed by the processor 602, cause the processor 602 to perform the operations described herein with reference to the UEs 115 in connection with aspects of the present disclosure, for example, aspects of FIGS. 3-6. Instructions 606 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The subband full duplex module 608 may be implemented via hardware, software, or combinations thereof. For example, the subband full duplex module 608 may be implemented as a processor, circuit, and/or instructions 606 stored in the memory 604 and executed by the processor 602. In some aspects, the subband full duplex module 608 may implement the aspects of FIGS. 3-5. For example, the subband full duplex module 608 may receive, from a network unit (e.g., network unit 700, the BS 105, the CU 210, the DU 230, or the RU 240), a first configuration indicating time location and frequency location for a network side subband full duplex (SBFD) mode of operation. The time location may indicate at least one SBFD symbol or slot (SBFD symbol/slot) format and the frequency location may indicate a plurality of downlink and uplink subbands or a plurality of uplink subbands and guard bands. The UE may receive, from the network unit, a second configuration indicating a change from the at least one SBFD symbol/slot format to a different SBFD symbol/slot format.

As shown, the transceiver 610 may include the modem subsystem 612 and the RF unit 614. The transceiver 610 may be configured to communicate bi-directionally with other devices, such as the BSs 105 and/or the UEs 115. The modem subsystem 612 may be configured to modulate and/or encode the data from the memory 604 and the according to a modulation and coding scheme (MCS), e.g., a low-density parity check (LDPC) coding scheme, a turbo coding scheme, a convolutional coding scheme, a digital beamforming scheme, etc. The RF unit 614 may be configured to process (e.g., perform analog to digital conversion or digital to analog conversion, etc.) modulated/encoded data from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together to enable the UE 600 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The antennas 616 may include multiple antennas of similar or different designs in order to sustain multiple transmission links. The RF unit 614 may configure the antennas 616.

In some instances, the UE 600 may include multiple transceivers 610 implementing different RATs (e.g., NR and LTE). In some instances, the UE 600 may include a single transceiver 610 implementing multiple RATs (e.g., NR and LTE). In some instances, the transceiver 610 may include various components, where different combinations of components may implement RATs.

Figure 7:
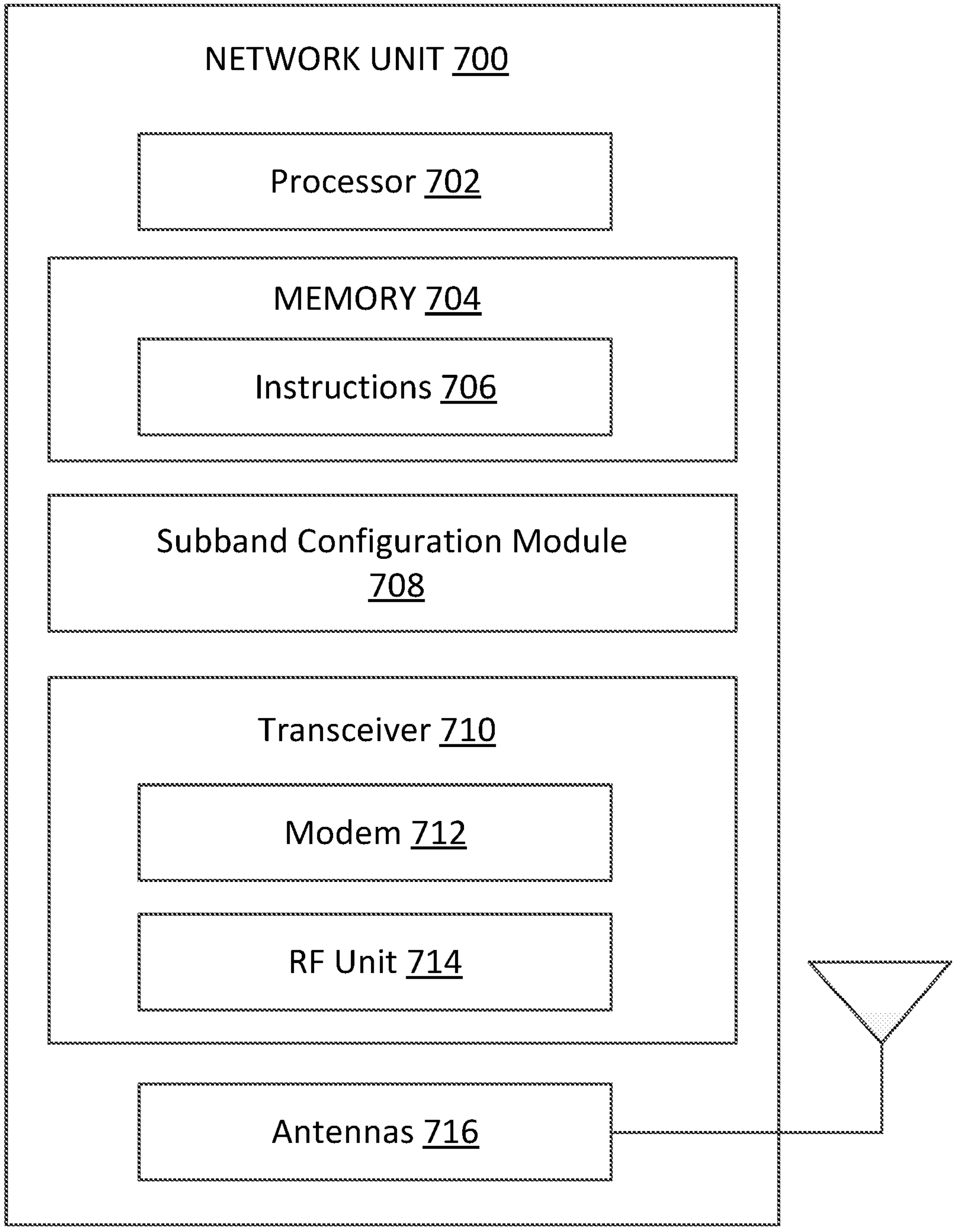
FIG. 7 is a block diagram of an exemplary network unit according to some aspects of the present disclosure.

FIG. 7 is a block diagram of an exemplary network unit 700 according to some aspects of the present disclosure. The network unit 700 may be the BS 105, the CU 210, the DU 230, or the RU 240, as discussed above. As shown, the network unit 700 may include a processor 702, a memory 704, a subband full duplex module 708, a transceiver 710 including a modem subsystem 712 and a RF unit 714, and one or more antennas 716. These elements may be coupled with each other and in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some instances, the memory 704 may include a non-transitory computer-readable medium. The memory 704 may store instructions 706. The instructions 706 may include instructions that, when executed by the processor 702, cause the processor 702 to perform operations described herein, for example, aspects of FIGS. 3-5. Instructions 706 may also be referred to as code, which may be interpreted broadly to include any type of computer-readable statement(s).

The subband full duplex module 708 may be implemented via hardware, software, or combinations thereof. For example, the subband full duplex module 708 may be implemented as a processor, circuit, and/or instructions 706 stored in the memory 704 and executed by the processor 702.

In some aspects, the subband full duplex module 708 may implement the aspects of FIGS. 3-5. For example, the subband full duplex module 708 may transmit, to a UE (e.g., the UE 115 or the UE 600), a first configuration indicating time location and frequency location for a network side subband full duplex (SBFD) mode of operation. The time location may indicate at least one SBFD symbol or slot (SBFD symbol/slot) format and the frequency location may indicate a plurality of downlink and uplink subbands or a plurality of uplink subbands and guard bands. The network unit may transmit, to the UE, a second configuration indicating a change from the at least one SBFD symbol/slot format to a different SBFD symbol/slot format.

Additionally or alternatively, the subband full duplex module 708 may be implemented in any combination of hardware and software, and may, in some implementations, involve, for example, processor 702, memory 704, instructions 706, transceiver 710, and/or modem 712.

As shown, the transceiver 710 may include the modem subsystem 712 and the RF unit 714. The transceiver 710 may be configured to communicate bi-directionally with other devices, such as the UEs 115 and/or UE 600. The modem subsystem 712 may be configured to modulate and/or encode data according to a MCS, e.g., a LDPC coding scheme, a turbo coding scheme, a convolutional coding scheme, a digital beamforming scheme, etc. The RF unit 714 may be configured to process (e.g., perform analog to digital conversion or digital to analog conversion, etc.) modulated/encoded data from the modem subsystem 712 (on outbound transmissions) or of transmissions originating from another source such as a UE 115 or UE 600. The RF unit 714 may be further configured to perform analog beamforming in conjunction with the digital beamforming. Although shown as integrated together in transceiver 710, the modem subsystem 712 and/or the RF unit 714 may be separate devices that are coupled together at the network unit 700 to enable the network unit 700 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, a configuration indicating a plurality of sub-slots within a slot according to aspects of the present disclosure. The antennas 716 may further receive data messages transmitted from other devices and provide the received data messages for processing and/or demodulation at the transceiver 710. The antennas 716 may include multiple antennas of similar or different designs in order to sustain multiple transmission links.

In some instances, the network unit 700 may include multiple transceivers 710 implementing different RATs (e.g., NR and LTE). In some instances, the network unit 700 may include a single transceiver 710 implementing multiple RATs (e.g., NR and LTE). In some instances, the transceiver 710 may include various components, where different combinations of components may implement RATs.

Figure 8:
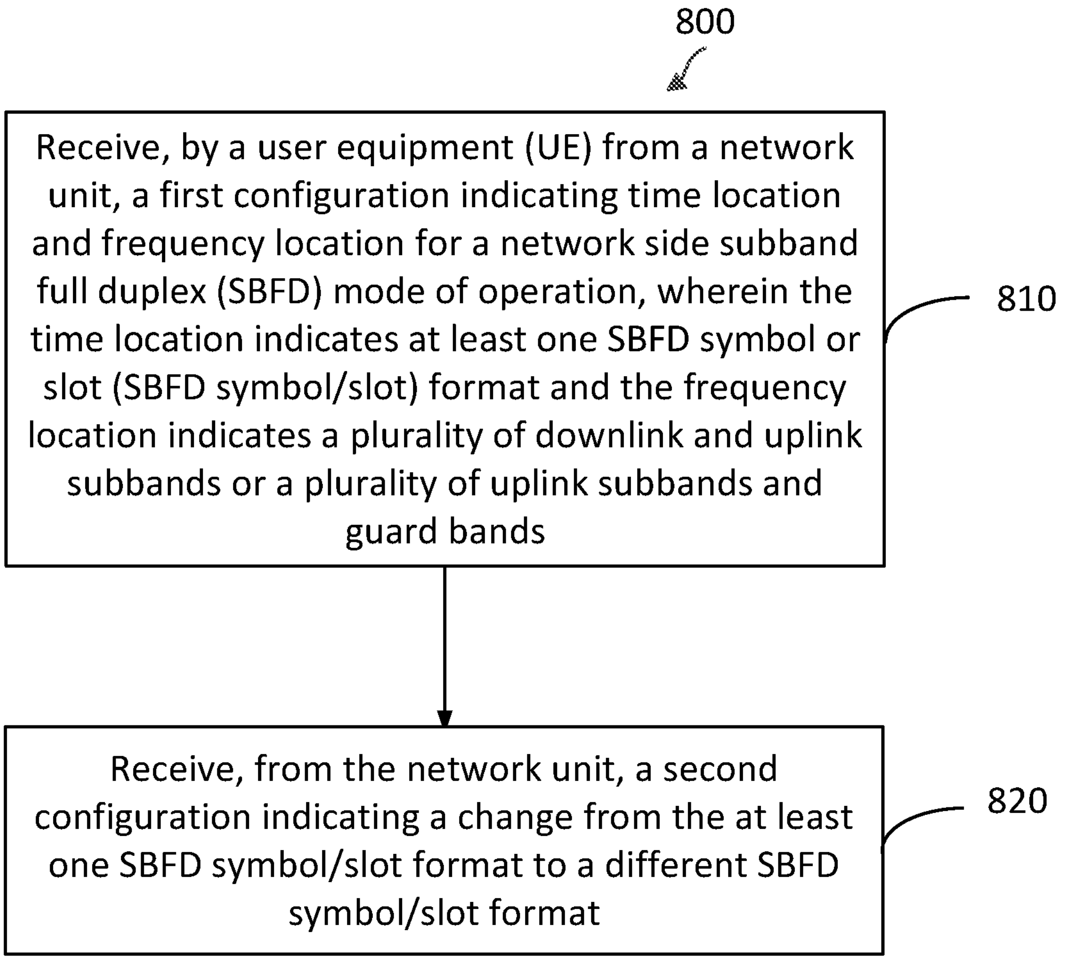
FIG. 8 is a flow diagram of a communication method according to some aspects of the present disclosure.

FIG. 8 is a flow diagram of a communication method 800 according to some aspects of the present disclosure. Aspects of the method 800 can be executed by a computing device (e.g., a processor, processing circuit, and/or other suitable component) of a wireless communication device or other suitable means for performing the actions. For example, a wireless communication device, such as the UE 115 or the UE 600, may utilize one or more components, such as the processor 602, the memory 604, the subband configuration module 608, the transceiver 610, the modem 612, and the one or more antennas 616, to execute aspects of method 800. The method 800 may employ similar mechanisms as in the networks 100 and 200 and the aspects and actions described with respect to FIGS. 3-5. As illustrated, the method 800 includes a number of enumerated actions, but the method 800 may include additional actions before, after, and in between the enumerated actions. In some aspects, one or more of the enumerated actions may be omitted or performed in a different order.

At action 810, the method 800 includes a UE (e.g., the UE 115 or the UE 600) receiving a first configuration from a network unit (e.g., the network unit 700, the BS 105, the RU 240, the DU 230, and/or the CU 210) indicating time location and frequency location for a network side subband full duplex (SBFD) mode of operation. In this regard, the UE may receive the first configuration via at least one of a cell common radio resource control (RRC) communication, a UE dedicated RRC communication, a medium access control control (MAC-CE) communication, UE dedicated downlink control information (DCI), and/or UE group common DCI.

In some aspects, the time location may indicate one or more slot locations, one or more symbol locations, and/or a time period (e.g., a number of milliseconds) in which the subbands are configured for an SBFD symbol/slot format. An SBFD symbol may be a symbol during which the network unit operates in an SBFD mode. An SBFD slot may be a slot during which the network unit operates in an SBFD mode. When operating in SBFD mode, the network unit may transmit to one or more UEs in subbands of a component carrier(s) (e.g., a time-division duplex (TDD) carrier) while simultaneously receiving communications from one or more other UEs in other subbands of the component carrier(s). In some aspects, the network unit may operate in SBFD mode over multiple component carriers.

In some aspects, the frequency location may indicate a plurality of downlink subbands, uplink subbands, and/or flexible subbands. The frequency location may indicate any combination of downlink subbands, uplink subbands, and/or flexible subbands. For example, the frequency location may include a downlink/uplink/downlink (D/U/D) format indicating downlink subbands in a higher portion (e.g. an edge portion) of the component carrier, uplink subbands located within a middle portion of the component carrier and downlink subbands in a lower portion (e.g., an edge portion) of the component carrier. Additionally or alternatively, the frequency location may include a flexible/uplink/flexible (F/U/F) format indicating flexible subbands in a higher portion (e.g. an edge portion) of the component carrier, uplink subbands located within a middle portion of the component carrier and flexible subbands in a lower portion (e.g., an edge portion) of the component carrier. Additionally or alternatively, the frequency location may include a uplink/downlink/uplink (U/D/U) format indicating uplink subbands in a higher portion (e.g. an edge portion) of the component carrier, downlink subbands located within a middle portion of the component carrier and uplink subbands in a lower portion (e.g., an edge portion) of the component carrier. Additionally or alternatively, the frequency location may include a U/D format indicating uplink subbands in a higher portion of a component carrier and downlink subbands in a lower portion of the component carrier. Additionally or alternatively, the frequency location may include a D/U format indicating downlink subbands in a higher portion of a component carrier and uplink subbands in a lower portion of the component carrier.

In some aspects, the downlink subbands, the uplink subbands, and the flexible subbands do not overlap one another. In this regard, the downlink subbands, uplink subbands, and flexible subbands may be separated from one another by guard bands. The first configuration may indicate guards bands associated with the frequency locations of the subbands. The guard bands may be frequencies in which the network unit and/or the UE refrain from transmitting in. The guard bands may be located contiguous to the upper end and/or the lower end of the subbands. In some aspects, the size of the guard bands may be based on the frequencies associated with the subbands, the frequency range of the subbands (e.g., the number of subbands), or other suitable parameter(s).

In some aspects, the UE may apply the first configuration to one or more component carriers. For example, the UE may receive a list of component carriers from the network unit to which the UE may apply the first configuration. In some aspects, the plurality of downlink and uplink subbands or the plurality of uplink subbands and guard bands are cross multiple time-division duplex (TDD) carriers in which cach downlink subband and/or uplink subband is a component carrier.

In some aspects, the at least one SBFD symbol/slot may be configured on a legacy downlink symbol/slot, a legacy uplink symbol/slot, and/or a legacy flexible symbol/slot and be treated as a fixed SBFD configuration with a plurality of downlink subbands, uplink subbands, and/or flexible subbands. For example, the UE may receive an initial RRC configuration (e.g., legacy configuration) prior to receiving the first configuration. The legacy configuration may configure all subbands of the component carrier as a legacy downlink symbol/slot, a legacy uplink symbol/slot, or a legacy flexible symbol/slot. The flexible symbol/slot may be configured for DL communication and/or UL communication. The initial RRC (e.g., legacy) configuration may configure all of the subbands of the frequency band to a single type of communication (e.g., all subbands configured for UL communication, DL communication, or flexible communication).

At action 820, the method 800 includes the UE receiving a second configuration from the network unit indicating a change from the at least one SBFD symbol/slot format to a different SBFD symbol/slot format. In this regard, the UE may receive the second configuration via at least one of a cell common radio resource control (RRC) communication, a UE dedicated RRC communication, a medium access control control (MAC-CE) communication, UE dedicated downlink control information (DCI), or UE group common DCI. The UE may apply the second configuration to one or more component carriers indicated in the component carrier list.

In some aspects, the first configuration may enable the network unit to operate in a full duplex TDD mode in which the network unit simultaneously transmits communications to some UEs and receives communications from other UEs. However, when simultaneously transmitting and receiving, the network unit may experience self-interference (e.g., interference to a receiver of the network unit caused by a transmitter of the network unit) and/or clutter interference (e.g., interference to a receiver of the network unit caused by a reflection of a signal transmitted by the network unit). In order to mitigate these interference effects, the network unit may transmit the second configuration to the UE changing the frequency location and/or the symbol/slot format associated with the subbands.

In some aspects, the second configuration may indicate a change (e.g., an update) from an SBFD symbol/slot format to a different SBFD symbol/slot format. The second configuration may indicate the change as a fallback from any SBFD symbol/slot format (e.g., uplink, downlink, or flexible) to an initial RRC configured symbol/slot format. For example, the change may be from an SBFD D/U/D format to an initial downlink format. The change may be from an SBFD F/U/F format to an initial flexible format. The change may be from an SBFD U/D/U format to an initial uplink format.

Additionally or alternatively, the second configuration may indicate the change as a fallback from any SBFD symbol/slot format (e.g., uplink, downlink, or flexible) to an initial slot format indicator (SFI) configured symbol/slot format. For example, the change may be from an SBFD D/U/D format to an SFI configured downlink format. The change may be from an SBFD F/U/F format to an SFI configured flexible format. The change may be from an SBFD U/D/U format to an SFI configured uplink format.

Additionally or alternatively, the second configuration may update (e.g., override) the frequency location and/or SBFD symbol/slot format for some or all of the subbands. For example, the first configuration may configure the subbands for an SBFD symbol/slot format (e.g., uplink, downlink, and/or flexible communication), while the second configuration changes the frequency location and/or the SBFD symbol/slot format. In some aspects, the frequency location may remain the same in the second configuration but the SBFD symbol/slot format may change. In other words, the second configuration may change the type of communication for the same subbands configured by the first configuration. In some aspects, the second configuration may change the frequency location of the subbands. The second configuration may increase or decrease the number of subbands (e.g., the bandwidth) associated with uplink, downlink, and/or flexible communications.

In some aspects, the second configuration may change the time resources associated the SBFD symbol/slot format. In this regard, the second configuration may change (e.g., update) one or more slot locations, one or more symbol locations, and or a time period (e.g., a number of milliseconds) associated the SBFD symbol/slot format.

In some aspects, the second configuration may change the guards bands associated with the subbands. The guard bands may be frequencies in which the network unit and/or the UE refrain from transmitting in. The guard bands may be located contiguous to the upper end and/or the lower end of the subbands. The second configuration may change the size of the guard bands based on the change in the frequency locations and/or the change in the SBFD symbol/slot format.

In some aspects, the second configuration may indicate a change from an SBFD symbol/slot to a different SBFD symbol/slot format based on a buffer status report (BSR) associated with the UE. In this regard, the UE may transmit a buffer status report (BSR) to the network unit indicating an amount of data (e.g., number of transport blocks) the UE has scheduled for transmitting to the network unit. The network unit may determine the second configuration based, at least in part, on the BSR. For example, if the BSR indicates the UE has an amount of data that exceeds the capacity of the resources indicated in the first configuration, the network unit may transmit the second configuration to the UE that increases the UL communication resources. For example, the second configuration may increase the number of frequency subbands, the number of slots, and/or the number of symbols allocated to the UE for UL communications.

In some aspects, the UE may apply the second configuration after a time period following the receipt of the second configuration. In some aspects, the second configuration may indicate when the UE should apply the second configuration. In some aspects, the time period may be preconfigured in the UE. The time period may include a number of symbols, a number of slots, a number of milliseconds, or other suitable time period before the UE applies the third configuration. In some aspects, the time period may be based on a subcarrier spacing (SCS) associated with the subbands.

In some aspects, the UE may transmit a HARQ ACK communication to the network unit acknowledging receipt of the second configuration. The UE may apply the second configuration after a time period following the transmitting of the HARQ ACK to the network unit. For example, the UE may apply the second configuration a number of symbols, a number of slots, a number of milliseconds, or other suitable time period after transmitting the HARQ ACK.

In some aspects, the UE may receive a second configuration that overrides or partially overrides the first configuration. For example, the second configuration may change the SBFD symbol/slot format (e.g., slots, symbols, subbands) of the first configuration. Additionally or alternatively, the second configuration may change the SBFD symbol/slot format to revert (e.g., fallback) to the initial (e.g., legacy) RRC configuration.

In some aspects, the UE may cancel one or more scheduled communications based on the second configuration. For example, the UE may cancel one or more scheduled uplink communications based on the second configuration changing one or SBFD symbol/slot formats to DL symbol/slot format or flexible symbol/slot format. Additionally or alternatively, the UE may cancel one or more scheduled downlink communications based on the second configuration changing one or SBFD symbol/slot formats to UL symbol/slot format or flexible symbol/slot format.

In some aspects, the UE may cancel one or more scheduled uplink communications based on the second configuration changing one or SBFD symbol/slot formats to a legacy downlink symbol/slot format or a legacy flexible symbol/slot format. Additionally or alternatively, the UE may cancel one or more scheduled downlink communications based on the second configuration changing one or SBFD symbol/slot formats to a legacy uplink symbol/slot format or a legacy flexible symbol/slot format.

In some aspects, the UE may cancel one or more scheduled downlink communications except physical downlink control channel (PDCCH) communications based on the second configuration indicating the change to a legacy downlink symbol/slot format. The UE may receive the PDCCH in one or more symbols in a CORESET configured for the UE to monitor.

In some aspects, the UE may receive a third configuration from the network unit comprising a parameter set (e.g., frequency domain resource allocation, transmit power, beam selection, timing advance, modulation and coding scheme, etc.) associated with DL communication and/or a parameter set (e.g., frequency domain resource allocation, transmit power, beam selection, timing advance, modulation and coding scheme, etc.) associated with UL communication based on the second configuration indicating a change to a legacy flexible symbol/slot format. The UE may receive PDSCH-SPS communications, CSI-RS, and PDCCH communications across the downlink subbands without rate matching or puncturing. The UE may transmit CG, SRS, and/or PUCCH communications across the uplink subchannels using the parameter set in the third configuration without adjusting a frequency hopping offset.

In some aspects, the UE may monitor for the second configuration in group-common downlink control information (DCI) or a medium access control control (MAC-CE) communication. However, the UE may not receive (e.g., decode) the second configuration in the group-common DCI or the MAC-CE communication. In response to not receiving (e.g., not successfully decoding) the second configuration, the UE may reserve resources (e.g., symbols/slots) associated with flexible SBFD symbols/slots. The UE may monitor for a PDCCH in the reserved resources and receive a PDSCH communication and/or a channel state information reference signal (CSI-RS) if indicated by a dynamic grant. However, the UE may cancel periodic downlink communications (e.g., SPS, CSI-RS) and/or periodic uplink communications (e.g., SRS, PUCCH, PUSCH) in response to not receiving the second configuration.

Figure 9:
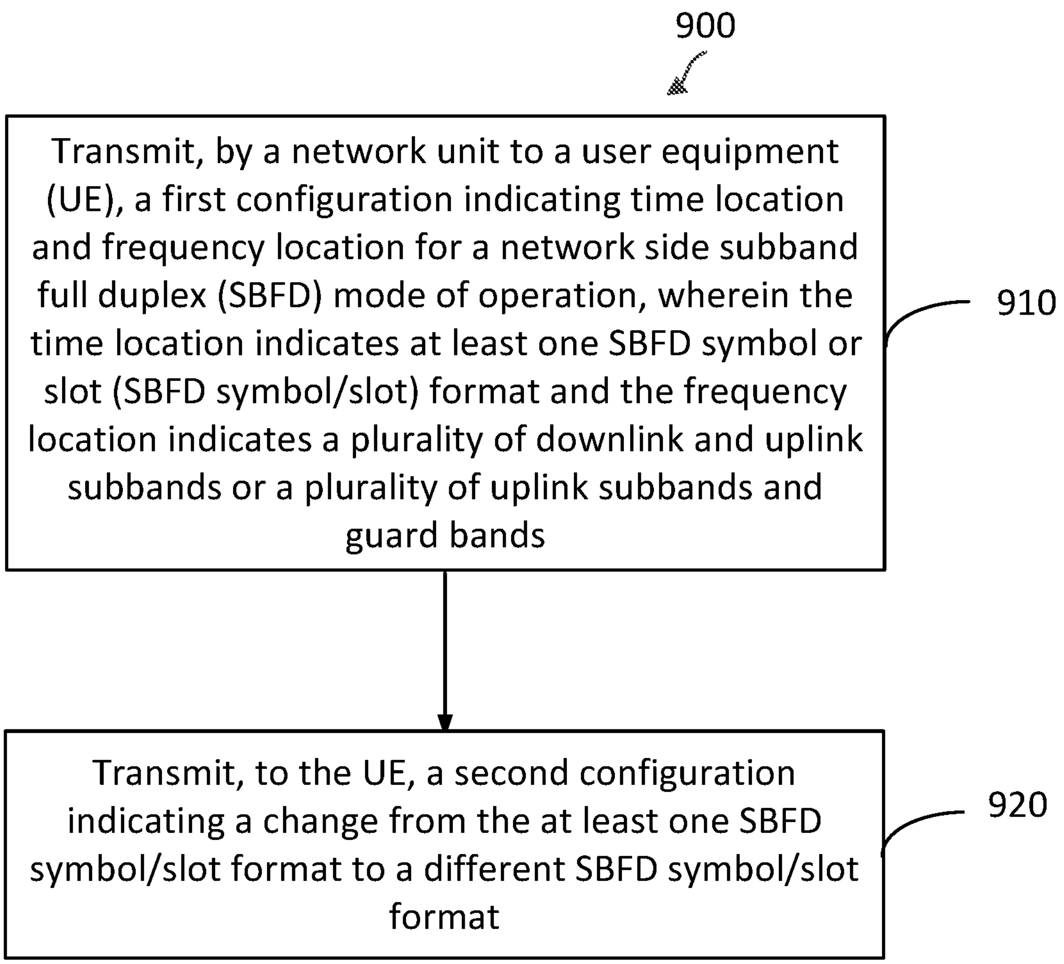
FIG. 9 is a flow diagram of a communication method according to some aspects of the present disclosure.

FIG. 9 is a flow diagram of a communication method 900 according to some aspects of the present disclosure. Aspects of the method 900 can be executed by a computing device (e.g., a processor, processing circuit, and/or other suitable component) of a wireless communication device or other suitable means for performing the actions. For example, a wireless communication device, such as a network unit (e.g., the network unit 700, the BS 105, the RU 240, the DU 230, and/or the CU 210), may utilize one or more components, such as the processor 702, the memory 704, the subband full duplex module 708, the transceiver 710, the modem 712, and the one or more antennas 716, to execute aspects of method 900. The method 900 may employ similar mechanisms as in the networks 100 and 200 and the aspects and actions described with respect to FIGS. 3-5. As illustrated, the method 800 includes a number of enumerated actions, but the method 800 may include additional actions before, after, and in between the enumerated actions. In some aspects, one or more of the enumerated actions may be omitted or performed in a different order.

At action 910, the method 900 includes a network unit (e.g., the network unit 700, the BS 105, the RU 240, the DU 230, and/or the CU 210) transmitting a first configuration to a UE (e.g., the UE 115 or the UE 600) indicating time location and frequency location for a network side subband full duplex (SBFD) mode of operation. In this regard, the network unit may transmit the first configuration via at least one of a cell common radio resource control (RRC) communication, a UE dedicated RRC communication, a medium access control control (MAC-CE) communication, UE dedicated downlink control information (DCI), and/or UE group common DCI.

In some aspects, the time location may indicate one or more slot locations, one or more symbol locations, and/or a time period (e.g., a number of milliseconds) in which the subbands are configured for an SBFD symbol/slot format. An SBFD symbol may be a symbol during which the network unit operates in an SBFD mode. An SBFD slot may be a slot during which the network unit operates in an SBFD mode. When operating in SBFD mode, the network unit may transmit to one or more UEs in subbands of a component carrier(s) (e.g., a time-division duplex (TDD) carrier) while simultaneously receiving communications from one or more other UEs in other subbands of the component carrier(s). In some aspects, the network unit may operate in SBFD mode over multiple component carriers.

In some aspects, the frequency location may indicate a plurality of downlink subbands, uplink subbands, and/or flexible subbands. The frequency location may indicate any combination of downlink subbands, uplink subbands, and/or flexible subbands. For example, the frequency location may include a downlink/uplink/downlink (D/U/D) format indicating downlink subbands in a higher portion (e.g. an edge portion) of the component carrier, uplink subbands located within a middle portion of the component carrier and downlink subbands in a lower portion (e.g., an edge portion) of the component carrier. Additionally or alternatively, the frequency location may include a flexible/uplink/flexible (F/U/F) format indicating flexible subbands in a higher portion (e.g. an edge portion) of the component carrier, uplink subbands located within a middle portion of the component carrier and flexible subbands in a lower portion (e.g., an edge portion) of the component carrier. Additionally or alternatively, the frequency location may include a uplink/downlink/uplink (U/D/U) format indicating uplink subbands in a higher portion (e.g. an edge portion) of the component carrier, downlink subbands located within a middle portion of the component carrier and uplink subbands in a lower portion (e.g., an edge portion) of the component carrier. Additionally or alternatively, the frequency location may include a U/D format indicating uplink subbands in a higher portion of a component carrier and downlink subbands in a lower portion of the component carrier. Additionally or alternatively, the frequency location may include a D/U format indicating downlink subbands in a higher portion of a component carrier and uplink subbands in a lower portion of the component carrier.

In some aspects, the downlink subbands, the uplink subbands, and the flexible subbands do not overlap one another. In this regard, the downlink subbands, uplink subbands, and flexible subbands may be separated from one another by guard bands. The first configuration may indicate guards bands associated with the frequency locations of the subbands. The guard bands may be frequencies in which the network unit and/or the UE refrain from transmitting in. The guard bands may be located contiguous to the upper end and/or the lower end of the subbands. In some aspects, the size of the guard bands may be based on the frequencies associated with the subbands, the frequency range of the subbands (e.g., the number of subbands), or other suitable parameter(s).

In some aspects, the UE may apply the first configuration to one or more component carriers. For example, the UE may receive a list of component carriers from the network unit to which the UE may apply the first configuration. In some aspects, the plurality of downlink and uplink subbands or the plurality of uplink subbands and guard bands are cross multiple time-division duplex (TDD) carriers in which cach downlink subband and/or uplink subband is a component carrier.

In some aspects, the at least one SBFD symbol/slot may be configured on a legacy downlink symbol/slot, a legacy uplink symbol/slot, and/or a legacy flexible symbol/slot and be treated as a fixed SBFD configuration with a plurality of downlink subbands, uplink subbands, and/or flexible subbands. For example, the network unit may transmit an initial RRC configuration to the UE (e.g., legacy configuration) prior to transmitting the first configuration. The legacy configuration may configure all subbands of the component carrier as a legacy downlink symbol/slot, a legacy uplink symbol/slot, or a legacy flexible symbol/slot. The flexible symbol/slot may be configured for DL communication and/or UL communication. The initial RRC (e.g., legacy) configuration may configure all of the subbands of the frequency band to a single type of communication (e.g., all subbands configured for UL communication, DL communication, or flexible communication).

At action 920, the method 900 includes the network unit transmitting a second configuration to the UE indicating a change from the at least one SBFD symbol/slot format to a different SBFD symbol/slot format. In this regard, the network unit may transmit the second configuration via at least one of a cell common radio resource control (RRC) communication, a UE dedicated RRC communication, a medium access control control (MAC-CE) communication, UE dedicated downlink control information (DCI), or UE group common DCI. The UE may apply the second configuration to one or more component carriers indicated in the component carrier list.

In some aspects, the first configuration may enable the network unit to operate in a full duplex TDD mode in which the network unit simultaneously transmits communications to some UEs and receives communications from other UEs. However, when simultaneously transmitting and receiving, the network unit may experience self-interference (e.g., interference to a receiver of the network unit caused by a transmitter of the network unit) and/or clutter interference (e.g., interference to a receiver of the network unit caused by a reflection of a signal transmitted by the network unit). In order to mitigate these interference effects, the network unit may transmit the second configuration to the UE changing the frequency location and/or the symbol/slot format associated with the subbands.

In some aspects, the second configuration may indicate a change (e.g., an update) from an SBFD symbol/slot format to a different SBFD symbol/slot format. Additionally or alternatively, the second configuration may indicate the change as a fallback from any SBFD symbol/slot format (e.g., uplink, downlink, or flexible) to an initial RRC configured symbol/slot format. For example, the change may be from an SBFD D/U/D format to an initial downlink format. The change may be from an SBFD F/U/F format to an initial flexible format. The change may be from an SBFD U/D/U format to an initial uplink format.

Additionally or alternatively, the second configuration may indicate the change as a fallback from any SBFD symbol/slot format (e.g., uplink, downlink, or flexible) to an initial slot format indicator (SFI) configured symbol/slot format. For example, the change may be from an SBFD D/U/D format to an SFI configured downlink format. The change may be from an SBFD F/U/F format to an SFI configured flexible format. The change may be from an SBFD U/D/U format to an SFI configured uplink format.

Additionally or alternatively, the second configuration may update (e.g., override) the frequency location and/or SBFD symbol/slot format for some or all of the subbands. For example, the first configuration may configure the subbands for an SBFD symbol/slot format (e.g., uplink, downlink, and/or flexible communication), while the second configuration changes the frequency location and/or the SBFD symbol/slot format. In some aspects, the frequency location may remain the same in the second configuration but the SBFD symbol/slot format may change. In other words, the second configuration may change the type of communication for the same subbands configured by the first configuration. In some aspects, the second configuration may change the frequency location of the subbands. The second configuration may increase or decrease the number of subbands (e.g., the bandwidth) associated with uplink, downlink, and/or flexible communications.

In some aspects, the second configuration may change the time resources associated the SBFD symbol/slot format. In this regard, the second configuration may change (e.g., update) one or more slot locations, one or more symbol locations, and or a time period (e.g., a number of milliseconds) associated the SBFD symbol/slot format.

In some aspects, the second configuration may change the guards bands associated with the subbands. The guard bands may be frequencies in which the network unit and/or the UE refrain from transmitting in. The guard bands may be located contiguous to the upper end and/or the lower end of the subbands. The second configuration may change the size of the guard bands based on the change in the frequency locations and/or the change in the SBFD symbol/slot format.

In some aspects, the second configuration may indicate a change from an SBFD symbol/slot to a different SBFD symbol/slot format based on a buffer status report (BSR) associated with the UE. In this regard, the network unit may receive a buffer status report (BSR) from the UE indicating an amount of data (e.g., number of transport blocks) the UE has scheduled for transmitting to the network unit. The network unit may determine the second configuration based, at least in part, on the BSR. For example, if the BSR indicates the UE has an amount of data that exceeds the capacity of the resources indicated in the first configuration, the network unit may transmit the second configuration to the UE that increases the UL communication resources. For example, the second configuration may increase the number of frequency subbands, the number of slots, and/or the number of symbols allocated to the UE for UL communications.

In some aspects, the UE may apply the second configuration after a time period following the receipt of the second configuration. In some aspects, the second configuration may indicate when the UE should apply the second configuration. In some aspects, the time period may be preconfigured in the UE. The time period may include a number of symbols, a number of slots, a number of milliseconds, or other suitable time period before the UE applies the third configuration. In some aspects, the time period may be based on a subcarrier spacing (SCS) associated with the subbands.

In some aspects, the network unit may receive a HARQ ACK communication from the UE acknowledging receipt of the second configuration. The UE may apply the second configuration after a time period following the transmitting of the HARQ ACK to the network unit. For example, the UE may apply the second configuration a number of symbols, a number of slots, a number of milliseconds, or other suitable time period after transmitting the HARQ ACK.

In some aspects, the network unit may transmit a second configuration that overrides or partially overrides the first configuration. For example, the second configuration may change the SBFD symbol/slot format (e.g., slots, symbols, subbands) of the first configuration. Additionally or alternatively, the second configuration may change the SBFD symbol/slot format to revert (e.g., fallback) to the initial (e.g., legacy) RRC configuration.

In some aspects, the network unit may cancel one or more scheduled communications based on the second configuration. For example, the network unit may cancel one or more scheduled uplink communications based on the second configuration changing one or SBFD symbol/slot formats to DL symbol/slot format or flexible symbol/slot format. Additionally or alternatively, the network unit may cancel one or more scheduled downlink communications based on the second configuration changing one or SBFD symbol/slot formats to UL symbol/slot format or flexible symbol/slot format.

In some aspects, the network unit may cancel one or more scheduled uplink communications based on the second configuration changing one or SBFD symbol/slot formats to a legacy downlink symbol/slot format or a legacy flexible symbol/slot format. Additionally or alternatively, the network unit may cancel one or more scheduled downlink communications based on the second configuration changing one or SBFD symbol/slot formats to a legacy uplink symbol/slot format or a legacy flexible symbol/slot format.

In some aspects, the network unit may cancel one or more scheduled downlink communications except physical downlink control channel (PDCCH) communications based on the second configuration indicating the change to a legacy downlink symbol/slot format. The network unit may transmit the PDCCH in one or more symbols in a CORESET configured for the UE to monitor.

In some aspects, the network unit may transmit a third configuration to the UE comprising a parameter set (e.g., frequency domain resource allocation, transmit power, beam selection, timing advance, modulation and coding scheme, etc.) associated with DL communication and/or a parameter set (e.g., frequency domain resource allocation, transmit power, beam selection, timing advance, modulation and coding scheme, etc.) associated with UL communication based on the second configuration indicating a change to a legacy flexible symbol/slot format. The network unit may transmit PDSCH-SPS communications, CSI-RS, and PDCCH communications across the downlink subbands without rate matching or puncturing. The UE may transmit CG, SRS, and/or PUCCH communications across the uplink subchannels using the parameter set in the third configuration without adjusting a frequency hopping offset.

In some aspects, the network unit may transmit the second configuration in group-common downlink control information (DCI) or a medium access control control (MAC-CE) communication. However, the UE may monitor for but not receive (e.g., decode) the second configuration in the group-common DCI or the MAC-CE communication. In response to not receiving (e.g., not successfully decoding) the second configuration, the UE may reserve resources (e.g., symbols/slots) associated with flexible SBFD symbols/slots. The UE may monitor for a PDCCH in the reserved resources and receive a PDSCH communication and/or a channel state information reference signal (CSI-RS) if indicated by a dynamic grant. However, the UE may cancel periodic downlink communications (e.g., SPS, CSI-RS) and/or periodic uplink communications (e.g., SRS, PUCCH, PUSCH) in response to not receiving the second configuration.

Further aspects of the present disclosure include the following:

Aspect 1 includes a method of wireless communication performed by a user equipment (UE), the method comprising receiving, from a network unit, a first configuration indicating time location and frequency location for a network side subband full duplex (SBFD) mode of operation, wherein the time location indicates at least one SBFD symbol or slot (SBFD symbol/slot) and the frequency location indicates a plurality of downlink and uplink subbands or a plurality of uplink subbands and guard bands; and receiving, from the network unit, a second configuration indicating a change from the at least one SBFD symbol/slot to a different SBFD symbol/slot format.

Aspect 2 includes the method of aspect 1, wherein the at least one SBFD symbol/slot is configured in a legacy downlink symbol/slot or flexible symbol/slot.

Aspect 3 includes the method of any of aspects 1-2, wherein the at least one SBFD symbol/slot is configured on a legacy downlink symbol/slot or a legacy flexible symbol/slot and is treated as a fixed SBFD configuration with a plurality of downlink and uplink subbands.

Aspect 4 includes the method of any of aspects 1-3, further comprising applying the first configuration to one or more component carriers.

Aspect 5 includes the method of any of aspects 1-4, wherein the one or more component carriers are indicated in a component carrier list.

Aspect 6 includes the method of any of aspects 1-5, further comprising applying the second configuration to one or more component carriers.

Aspect 7 includes the method of any of aspects 1-6, wherein the one or more component carriers are indicated in a component carrier list.

Aspect 8 includes the method of any of aspects 1-7, wherein the downlink subbands do not overlap the uplink subbands.

Aspect 9 includes the method of any of aspects 1-8, wherein the uplink subbands are located within a middle portion of a component carrier.

Aspect 10 includes the method of any of aspects 1-9, wherein the uplink subbands are located at an edge portion of a component carrier.

Aspect 11 includes the method of any of aspects 1-10, wherein the plurality of downlink and uplink subbands or the plurality of uplink subbands and guard bands are within a time-division duplex (TDD) carrier.

Aspect 12 includes the method of any of aspects 1-11, wherein the plurality of downlink and uplink subbands or the plurality of uplink subbands and guard bands are cross multiple time-division duplex (TDD) carriers, whereas each downlink or uplink subband is a component carrier.

Aspect 13 includes the method of any of aspects 1-12, wherein the frequency location further indicates a plurality of uplink subbands and flexible subbands, wherein the SBFD symbol/slot is configured in a legacy flexible symbol/slot.

Aspect 14 includes the method of any of aspects 1-13, further comprising transmitting, to the network unit, a buffer status report (BSR) associated with the UE, wherein the second configuration is based, at least in part, on the BSR.

Aspect 15 includes the method of any of aspects 1-14, wherein the receiving the first configuration comprises receiving the first configuration via at least one of system information block (SIB1) signaling, a cell common radio resource control (RRC) communication, a UE dedicated RRC communication, a medium access control (MAC-CE) communication, or downlink control information (DCI).

Aspect 16 includes the method of any of aspects 1-15, wherein the receiving the second configuration comprises receiving the second configuration via at least one of a cell common radio resource control (RRC) communication, a UE dedicated RRC communication, a medium access control control (MAC-CE) communication, UE dedicated downlink control information (DCI), or UE group common DCI.

Aspect 17 includes the method of any of aspects 1-16, further comprising applying the second configuration after a gap time period following the receiving the second configuration.

Aspect 18 includes the method of any of aspects 1-17, wherein the gap time period comprises at least one of a number of symbols, a number of slots, or a number of milliseconds, wherein a subcarrier spacing (SCS) is based on an SCS associated with downlink control information (DCI), a medium access control control (MAC-CE) communication, or an applied bandwidth part SCS.

Aspect 19 includes the method of any of aspects 1-18, further comprising transmitting, to the network unit, an acknowledgement (ACK) associated with the receiving the second configuration; and applying the second configuration after a gap time period following the transmitting the ACK.

Aspect 20 includes the method of any of aspects 1-19, wherein the gap time period comprises at least one of a number of symbols, a number of slots, or a number of milliseconds.

Aspect 21 includes the method of any of aspects 1-20, further comprising cancelling one or more scheduled uplink communications based, at least in part, on the second configuration indicating the change to a legacy downlink symbol/slot.

Aspect 22 includes the method of any of aspects 1-21, further comprising cancelling one or more scheduled downlink communications except physical downlink control channel (PDCCH) communications based, at least in part, on the second configuration indicating the change to a legacy downlink symbol/slot.

Aspect 23 includes the method of any of aspects 1-22, receiving, from the network unit, a third configuration comprising a parameter set associated with downlink communication based, at least in part, on the second configuration indicating the change to a legacy downlink symbol/slot.

Aspect 24 includes the method of any of aspects 1-23, further comprising receiving, from the network unit, a third configuration comprising a parameter set associated with uplink communication based, at least in part, on the second configuration indicating the change to a legacy uplink symbol/slot.

Aspect 25 includes the method of any of aspects 1-24, further comprising cancelling one or more scheduled downlink communications based, at least in part, on the second configuration indicating the change to a legacy flexible symbol/slot; and cancelling one or more scheduled uplink communications based, at least in part, on the second configuration indicating the change to the legacy flexible symbol/slot.

Aspect 26 includes the method of any of aspects 1-25, further comprising cancelling one or more scheduled uplink communications based, at least in part, on the second configuration indicating the change to a legacy flexible symbol/slot; and receiving, from the network unit, a third configuration comprising a parameter set associated with downlink communication based, at least in part, on the second configuration indicating the change to the legacy flexible symbol/slot.

Aspect 27 includes the method of any of aspects 1-26, further comprising cancelling one or more scheduled downlink communications based, at least in part, on the second configuration indicating the change to a legacy uplink symbol/slot format.

Aspect 28 includes the method of any of aspects 1-27, further comprising cancelling one or more scheduled uplink communications based, at least in part, on the second configuration indicating the change to a legacy uplink symbol/slot.

Aspect 29 includes the method of any of aspects 1-28, wherein the change is from the SBFD symbol/slot to at least one of an initial radio resource control (RRC) configured symbol/slot or a symbol/slot format associated with a slot format indicator (SFI).

Aspect 30 includes the method of any of aspects 1-29, wherein the initial RRC configured symbol/slot is a RRC configured common downlink symbol/slot or a RRC configured dedicated downlink symbol/slot.

Aspect 31 includes the method of any of aspects 1-30, wherein the initial RRC configured symbol/slot is a RRC configured flexible symbol/slot.

Aspect 32 includes the method of any of aspects 1-31, wherein the RRC configured symbol/slot is a RRC configured common uplink symbol/slot or a RRC configured dedicated uplink symbol/slot.

Aspect 33 includes the method of any of aspects 1-32, wherein the change is from at least one of an initial radio resource control (RRC) configured downlink symbol/slot or a symbol/slot format associated with a slot format indicator (SFI) to an RRC configured uplink symbol/slot.

Aspect 34 includes the method of any of aspects 1-33, wherein the change is from at least one of an initial radio resource control (RRC) configured uplink symbol/slot or a symbol/slot format associated with a slot format indicator (SFI) to an RRC configured downlink symbol/slot.

Aspect 35 includes the method of any of aspects 1-34, wherein the second configuration indicates a change in at least one of a size of the downlink subbands, a size of the uplink subbands, or a size of the guard bands.

Aspect 36 includes the method of any of aspects 1-35, further comprising monitoring for the second configuration in group-common downlink control information (DCI) or a medium access control control (MAC-CE) communication; not detecting the second configuration in the group-common DCI or the MAC-CE communication; reserving resources associated with one or more flexible SBFD symbols/slots; receiving at least one of a physical downlink shared channel (PDSCH) communication or a channel state information reference signal (CSI-RS); cancelling one or more scheduled downlink communications; and cancelling one or more scheduled uplink communications.

Aspect 37 includes a method of wireless communication performed by a network unit, the method comprising transmitting, to a user equipment (UE), a first configuration indicating time location and frequency location for a network side subband full duplex (SBFD) mode of operation, wherein the time location indicates at least one SBFD symbol or slot (SBFD symbol/slot) and the frequency location indicates a plurality of downlink and uplink subbands or a plurality of uplink subbands and guard bands; and transmitting, to the UE, a second configuration indicating a change from the at least one SBFD symbol/slot to a different SBFD symbol/slot format.

Aspect 38 includes the method of aspect 37, wherein the at least one SBFD symbol/slot is configured in a legacy downlink symbol/slot or flexible symbol/slot.

Aspect 39 includes the method of any of aspects 37-38, wherein the at least one SBFD symbol/slot is configured on a legacy downlink symbol/slot or a legacy flexible symbol/slot and is treated as a fixed SBFD configuration with a plurality of downlink and uplink subbands.

Aspect 40 includes the method of any of aspects 37-39, further comprising applying the first configuration to one or more component carriers.

Aspect 41 includes the method of any of aspects 37-40, wherein the one or more component carriers are indicated in a component carrier list.

Aspect 42 includes the method of any of aspects 37-41, further comprising applying the second configuration to one or more component carriers.

Aspect 43 includes the method of any of aspects 37-42, wherein the one or more component carriers are indicated in a component carrier list.

Aspect 44 includes the method of any of aspects 37-43, wherein the downlink subbands do not overlap the uplink subbands.

Aspect 45 includes the method of any of aspects 37-44, wherein the uplink subbands are located within a middle portion of a component carrier.

Aspect 46 includes the method of any of aspects 37-45, wherein the uplink subbands are located at an edge portion of a component carrier.

Aspect 47 includes the method of any of aspects 37-46, wherein the plurality of downlink and uplink subbands or the plurality of uplink subbands and guard bands are within a time-division duplex (TDD) carrier.

Aspect 48 includes the method of any of aspects 37-47, wherein the plurality of downlink and uplink subbands or the plurality of uplink subbands and guard bands are cross multiple time-division duplex (TDD) carriers, whereas cach downlink or uplink subband is a component carrier.

Aspect 49 includes the method of any of aspects 37-48, wherein the frequency location further indicates a plurality of uplink subbands and flexible subbands, wherein the SBFD symbol/slot is configured in a legacy flexible symbol/slot.

Aspect 50 includes the method of any of aspects 37-49, further comprising receiving, from the UE, a buffer status report (BSR) associated with the UE, wherein the second configuration is based, at least in part, on the BSR.

Aspect 51 includes the method of any of aspects 37-50, wherein the transmitting the first configuration comprises transmitting the first configuration via at least one of system information block (SIB1) signaling, a cell common radio resource control (RRC) communication, a UE dedicated RRC communication, a medium access control control (MAC-CE) communication, or downlink control information (DCI).

Aspect 52 includes the method of any of aspects 37-51, wherein the transmitting the second configuration comprises transmitting the second configuration via at least one of a cell common radio resource control (RRC) communication, a UE dedicated RRC communication, a medium access control control (MAC-CE) communication, UE dedicated downlink control information (DCI), or UE group common DCI.

Aspect 53 includes the method of any of aspects 37-52, further comprising applying the second configuration after a gap time period following the transmitting the second configuration.

Aspect 54 includes the method of any of aspects 37-53, wherein the gap time period comprises at least one of a number of symbols, a number of slots, or a number of milliseconds, wherein a subcarrier spacing (SCS) is based on an SCS associated with downlink control information (DCI), a medium access control control (MAC-CE) communication, or an applied bandwidth part SCS.

Aspect 55 includes the method of any of aspects 37-54, further comprising receiving, from the UE, an acknowledgement (ACK) associated with the receiving the second configuration; and applying the second configuration after a gap time period following the transmitting the ACK.

Aspect 56 includes the method of any of aspects 37-55, wherein the gap time period comprises at least one of a number of symbols, a number of slots, or a number of milliseconds.

Aspect 57 includes the method of any of aspects 37-56, further comprising cancelling one or more scheduled uplink communications based, at least in part, on the second configuration indicating the change to a legacy downlink symbol/slot.

Aspect 58 includes the method of any of aspects 37-57, further comprising cancelling one or more scheduled downlink communications except physical downlink control channel (PDCCH) communications based, at least in part, on the second configuration indicating the change to a legacy downlink symbol/slot.

Aspect 59 includes the method of any of aspects 37-58, transmitting, to the UE, a third configuration comprising a parameter set associated with downlink communication based, at least in part, on the second configuration indicating the change to a legacy downlink symbol/slot.

Aspect 60 includes the method of any of aspects 37-59, further comprising transmitting, to the UE, a third configuration comprising a parameter set associated with uplink communication based, at least in part, on the second configuration indicating the change to a legacy uplink symbol/slot.

Aspect 61 includes the method of any of aspects 37-60, further comprising cancelling one or more scheduled downlink communications based, at least in part, on the second configuration indicating the change to a legacy flexible symbol/slot; and cancelling one or more scheduled uplink communications based, at least in part, on the second configuration indicating the change to the legacy flexible symbol/slot.

Aspect 62 includes the method of any of aspects 37-61, further comprising cancelling one or more scheduled uplink communications based, at least in part, on the second configuration indicating the change to a legacy flexible symbol/slot; and transmitting, to the UE, a third configuration comprising a parameter set associated with downlink communication based, at least in part, on the second configuration indicating the change to the legacy flexible symbol/slot.

Aspect 63 includes the method of any of aspects 37-62, further comprising cancelling one or more scheduled downlink communications based, at least in part, on the second configuration indicating the change to a legacy uplink symbol/slot format.

Aspect 64 includes the method of any of aspects 37-63, further comprising cancelling one or more scheduled uplink communications based, at least in part, on the second configuration indicating the change to a legacy uplink symbol/slot.

Aspect 65 includes the method of any of aspects 37-64, wherein the change is from the SBFD symbol/slot to at least one of an initial radio resource control (RRC) configured symbol/slot or a symbol/slot format associated with a slot format indicator (SFI).

Aspect 66 includes the method of any of aspects 37-65, wherein the initial RRC configured symbol/slot is a RRC configured common downlink symbol/slot or a RRC configured dedicated downlink symbol/slot.

Aspect 67 includes the method of any of aspects 37-66, wherein the initial RRC configured symbol/slot is a RRC configured flexible symbol/slot.

Aspect 68 includes the method of any of aspects 37-67, wherein the RRC configured symbol/slot is a RRC configured common uplink symbol/slot or a RRC configured dedicated uplink symbol/slot.

Aspect 69 includes the method of any of aspects 37-68, wherein the change is from at least one of an initial radio resource control (RRC) configured downlink symbol/slot or a symbol/slot format associated with a slot format indicator (SFI) to an RRC configured uplink symbol/slot.

Aspect 70 includes the method of any of aspects 37-69, wherein the change is from at least one of an initial radio resource control (RRC) configured uplink symbol/slot or a symbol/slot format associated with a slot format indicator (SFI) to an RRC configured downlink symbol/slot.

Aspect 71 includes the method of any of aspects 37-70, wherein the second configuration indicates a change in at least one of a size of the downlink subbands, a size of the uplink subbands, or a size of the guard bands.

Aspect 72 includes a non-transitory computer-readable medium storing one or more instructions for wireless communication, the one or more instructions comprising one or more instructions that, when executed by one or more processors of a user equipment (UE) cause the UE to perform any one of aspects 1-36.

Aspect 73 includes a non-transitory computer-readable medium storing one or more instructions for wireless communication, the one or more instructions comprising one or more instructions that, when executed by one or more processors of a network unit, cause the network unit to perform any one of aspects 37-71.

Aspect 74 includes a user equipment (UE) comprising one or more means to perform any one or more of aspects 1-36.

Aspect 75 includes a network unit comprising one or more means to perform any one or more of aspects 37-71.

Aspect 76 includes a user equipment (UE) comprising a memory; a transceiver; and at least one processor coupled to the memory and the transceiver, wherein the UE is configured to perform any one or more of aspects 1-36.

Aspect 77 includes a network unit comprising a memory; a transceiver; and at least one processor coupled to the memory and the transceiver, wherein the network unit is configured to perform any one or more of aspects 37-71.

Aspect 78 includes a method of wireless communication performed by a user equipment (UE), wherein at least one subband full duplex (SBFD) symbol/slot is configured for downlink/uplink/downlink communication in a legacy downlink symbol/slot or flexible symbol/slot.

Aspect 79 includes a method of wireless communication performed by a user equipment (UE), wherein at least one subband full duplex (SBFD) symbol/slot is configured on a legacy downlink symbol/slot or a legacy flexible symbol/slot and is treated as a fixed SBFD configuration with a plurality of downlink and uplink subbands.

Aspect 80 includes a method of wireless communication performed by a user equipment (UE), the method comprising applying a first configuration indicating time location and frequency location for a network side subband full duplex (SBFD) mode of operation to one or more component carriers.

Aspect 81 includes a method of wireless communication performed by a user equipment (UE), wherein at least one subband full duplex (SBFD) symbol/slot is configured for flexible/uplink/flexible communication on a legacy flexible symbol/slot and is treated as a flexible SBFD configuration with a plurality of flexible and uplink subbands.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations may be made in and to the materials, apparatus, configurations and methods of use of the devices of the present disclosure without departing from the spirit and scope thereof. In light of this, the scope of the present disclosure should not be limited to that of the particular instances illustrated and described herein, as they are merely by way of some examples thereof, but rather, should be fully commensurate with that of the claims appended hereafter and their functional equivalents.

What is claimed is:

1. A method of wireless communication performed by a user equipment (UE), the method comprising:

receiving, from a network unit, a first configuration indicating time location and frequency location for a network side subband full duplex (SBFD) mode of operation, wherein the time location indicates at least one SBFD symbol or slot (SBFD symbol/slot) format and the frequency location indicates a plurality of downlink and uplink subbands or a plurality of uplink subbands and guard bands;

receiving, from the network unit, a second configuration in a downlink control information (DCI) or medium access control control element (MAC-CE) communication, the second configuration indicating a change the at least one SBFD symbol/slot format to a different SBFD symbol/slot format, wherein the change is a fallback to an initial radio resource control (RRC) configuration; and modifying one or more scheduled downlink communications based on the second configuration indicating the change from the at least one SBFD symbol/slot format to the different SBFD symbol/slot format.

2. The method of claim 1, wherein the at least one SBFD symbol/slot is configured in a legacy downlink symbol/slot or flexible symbol/slot.

3. The method of claim 1, wherein the at least one SBFD symbol/slot is configured on a legacy downlink symbol/slot or a legacy flexible symbol/slot and is treated as a fixed SBFD configuration with a plurality of downlink and uplink subbands.

4. The method of claim 1, further comprising applying the first configuration to one or more component carriers.

5. The method of claim 1, wherein the plurality of downlink and uplink subbands or the plurality of uplink subbands and guard bands are within a time-division duplex (TDD) carrier.

6. The method of claim 1, further comprising:

applying the second configuration after a gap time period following the receiving the second configuration.

7. The method of claim 1, wherein the modifying comprises cancelling one or more scheduled downlink communications except physical downlink control channel (PDCCH) communications based, at least in part, on the second configuration indicating the change to a legacy downlink symbol/slot.

8. The method of claim 1, further comprising:

receiving, from the network unit, a third configuration comprising a parameter set associated with downlink communication based, at least in part, on the second configuration indicating the change to a legacy downlink symbol/slot.

9. The method of claim 1, further comprising:

receiving, from the network unit, a third configuration comprising a parameter set associated with uplink communication based, at least in part, on the second configuration indicating the change to a legacy uplink symbol/slot.

10. The method of claim 1, wherein the modifying comprises cancelling one or more scheduled downlink communications based, at least in part, on the second configuration indicating the change to a legacy flexible symbol/slot.

11. The method of claim 1, further comprising:

receiving, from the network unit, a third configuration comprising a parameter set associated with downlink communication based, at least in part, on the second configuration indicating the change to a legacy flexible symbol/slot.

12. The method of claim 1, wherein the modifying comprises cancelling one or more scheduled downlink communications based, at least in part, on the second configuration indicating the change to a legacy uplink symbol/slot format.

13. The method of claim 1, wherein the change is from the SBFD symbol/slot to at least one of an initial radio resource control (RRC) configured symbol/slot or a symbol/slot format associated with a slot format indicator (SFI).

14. The method of claim 13, wherein the initial RRC configured symbol/slot is a RRC configured common downlink symbol/slot or a RRC configured dedicated downlink symbol/slot.

15. The method of claim 13, wherein the initial RRC configured symbol/slot is a RRC configured flexible symbol/slot.

16. The method of claim 13, wherein the RRC configured symbol/slot is a RRC configured common uplink symbol/slot or a RRC configured dedicated uplink symbol/slot.

17. The method of claim 1, wherein the change is from at least one of an initial radio resource control (RRC) configured downlink symbol/slot or a symbol/slot format associated with a slot format indicator (SFI) to an RRC configured uplink symbol/slot.

18. The method of claim 1, wherein the change is from at least one of an initial radio resource control (RRC) configured uplink symbol/slot or a symbol/slot format associated with a slot format indicator (SFI) to an RRC configured downlink symbol/slot.

19. The method of claim 1, wherein the second configuration indicates a change in at least one of a size of the downlink subbands, a size of the uplink subbands, or a size of the guard bands.

20. The method of claim 1, further comprising:

not detecting the second configuration in the DCI or the MAC-CE communication;

reserving resources associated with one or more flexible SBFD symbols/slots in response to not detecting the second configuration; and receiving at least one of a physical downlink shared channel (PDSCH) communication or a channel state information reference signal (CSI-RS);

wherein the modifying comprises:

cancelling one or more scheduled downlink communications; and cancelling one or more scheduled uplink communications.

21. A user equipment (UE) comprising:

a memory;

a transceiver; and at least one processor coupled to the memory and the transceiver, wherein the UE is configured to:

receive, from a network unit, a first configuration indicating time location and frequency location for a network side subband full duplex (SBFD) mode of operation, wherein the time location indicates at least one SBFD symbol or slot (SBFD symbol/slot) format and the frequency location indicates a plurality of downlink and uplink subbands or a plurality of uplink subbands and guard bands;

receive, from the network unit, a second configuration in a downlink control information (DCI) or medium access control control element (MAC-CE) communication, the second configuration indicating a change from the at least one SBFD symbol/slot format to a different SBFD symbol/slot format, wherein the change is a fallback to an initial radio resource control (RRC) configuration; and modify one or more scheduled downlink communications based on the second configuration indicating the change from the at least one SBFD symbol/slot format to the different SBFD symbol/slot format.

22. The UE of claim 21, wherein the at least one SBFD symbol/slot is configured in a legacy downlink symbol/slot or flexible symbol/slot.

23. The UE of claim 21, wherein the at least one SBFD symbol/slot is configured on a legacy downlink symbol/slot or a legacy flexible symbol/slot and is treated as a fixed SBFD configuration with a plurality of downlink and uplink subbands.

24. The UE of claim 21, wherein the UE is further configured to:

apply the first configuration to one or more component carriers.

25. The UE of claim 21, wherein the plurality of downlink and uplink subbands or the plurality of uplink subbands and guard bands are within a time-division duplex (TDD) carrier.

26. The UE of claim 21, wherein the UE is further configured to:

apply the second configuration after a gap time period following the receiving the second configuration.

27. The UE of claim 21, wherein the modification comprises cancellation of one or more scheduled downlink communications except physical downlink control channel (PDCCH) communications based, at least in part, on the second configuration indicating the change to a legacy downlink symbol/slot.

* * * * *